US012333247B1

(12) United States Patent
Gaidylo et al.

(10) Patent No.: US 12,333,247 B1
(45) Date of Patent: Jun. 17, 2025

(54) AUTOMATICALLY APPLYING CORRECTION SUGGESTIONS IN TEXT CHECKING

(71) Applicant: GRAMMARLY, INC., San Francisco, CA (US)

(72) Inventors: Valentyn Gaidylo, Kyiv (UA); Lu Han, Simi Valley, CA (US); Yuriy Tanskiy, San Francisco, CA (US)

(73) Assignee: GRAMMARLY, INC.

( * ) Notice: Subject to any disclaimer, the term of this patent is extended or adjusted under 35 U.S.C. 154(b) by 45 days.

(21) Appl. No.: 17/896,476

(22) Filed: Aug. 26, 2022

Related U.S. Application Data

(60) Provisional application No. 63/321,214, filed on Mar. 18, 2022.

(51) Int. Cl.
*G06F 40/253* (2020.01)
*G06F 3/0481* (2022.01)
(Continued)

(52) U.S. Cl.
CPC .......... *G06F 40/253* (2020.01); *G06F 40/166* (2020.01); *G06F 40/232* (2020.01); *G06F 40/30* (2020.01); *G06F 3/0481* (2013.01)

(58) Field of Classification Search
CPC .... G06F 40/253; G06F 40/166; G06F 40/232; G06F 40/30
See application file for complete search history.

(56) References Cited

U.S. PATENT DOCUMENTS 9,852,239 B2 * 12/2017 Natarajan ............... G06F 30/20
10,210,147 B2 * 2/2019 DeLuca ............... G06F 16/345
(Continued)

FOREIGN PATENT DOCUMENTS

WO WO-2023059561 A1 * 4/2023
WO WO-2023225264 A1 * 11/2023

OTHER PUBLICATIONS

Hao Fei, Donghong Ji, Yue Zhang, and Yafeng Ren. 2020. Topic-Enhanced Capsule Network for Multi-Label Emotion Classification. IEEE/ACM Trans. Audio, Speech and Lang. Proc. 28 (2020), 1839-1848. https://doi.org/10.1109/TASLP.2020.3001390 (Year: 2020).*
(Continued)

*Primary Examiner* — Benjamin Smith
(74) *Attorney, Agent, or Firm* — Van Hoven PC; Jordan Becker

(57) ABSTRACT

A computer-implemented process is programmed to programmatically receive at a first computer a digital electronic object comprising a source text having been composed at a second computer, send instructions to the second computer for presenting filters via a user interface, which are programmed to adjust the source text when they are selected and executed, receive a selection of a first filter, generate an output set of suggestions based on executing the first filter over the source text, transmit the output set of suggestions to the second computer, receive a specification to apply the suggestions, and in response, automatically apply all the suggestions to the source text and transmit updated presentation instructions to the second computer which when rendered using the second computer cause displaying an updated text with all the suggestions having been applied to the source text.

22 Claims, 21 Drawing Sheets

(51) Int. Cl.
  *G06F 40/166* (2020.01)
  *G06F 40/232* (2020.01)
  *G06F 40/30* (2020.01)

(56) References Cited

U.S. PATENT DOCUMENTS

| | | | |
|---|---|---|---|
| 10,418,023 B2* | 9/2019 | Jiang | G10L 13/047 |
| 10,594,757 B1* | 3/2020 | Shevchenko | G06F 17/18 |
| 10,606,943 B2* | 3/2020 | Cunico | G06F 40/253 |
| 10,713,423 B2* | 7/2020 | Catalano | H04L 51/046 |
| 10,764,534 B1* | 9/2020 | Shevchenko | G10L 15/197 |
| 10,771,529 B1* | 9/2020 | Shevchenko | G06F 9/453 |
| 10,789,430 B2* | 9/2020 | Lev Tov | G06F 40/30 |
| 10,839,153 B2* | 11/2020 | Gaur | G06F 40/253 |
| 10,902,188 B2* | 1/2021 | Ragan, Jr. | G06F 40/166 |
| 10,902,189 B2* | 1/2021 | DeLuca | G06F 40/258 |
| 10,922,483 B1* | 2/2021 | Shevchenko | G06F 17/18 |
| 10,922,490 B2* | 2/2021 | Jain | H04L 51/063 |
| 10,963,627 B2* | 3/2021 | N | G06F 40/20 |
| 10,977,439 B2* | 4/2021 | Mishra | G06N 3/088 |
| 11,030,990 B2* | 6/2021 | Jiang | G10L 13/047 |
| 11,062,085 B2* | 7/2021 | Verma | G06F 40/166 |
| 11,068,758 B1* | 7/2021 | Liachenko | G06F 18/2178 |
| 11,074,595 B2* | 7/2021 | Natarajan | G06Q 30/0202 |
| 11,126,794 B2* | 9/2021 | Li | G06F 40/30 |
| 11,146,609 B1* | 10/2021 | Shevchenko | G06F 40/35 |
| 11,157,684 B2* | 10/2021 | Chiba | G06F 40/253 |
| 11,194,971 B1* | 12/2021 | Dobranic | G06V 30/18 |
| 11,228,731 B1* | 1/2022 | Shevchenko | G06F 40/30 |
| 11,258,734 B1* | 2/2022 | Shevchenko | G06F 40/186 |
| 11,301,640 B2* | 4/2022 | Sankaran | G06N 3/047 |
| 11,314,950 B2* | 4/2022 | Wu | G06F 40/56 |
| 11,321,522 B1* | 5/2022 | Shevchenko | G10L 15/197 |
| 11,361,151 B1 | 6/2022 | Guberman et al. | |
| 11,386,984 B2* | 7/2022 | Kartoun | G16H 15/00 |
| 11,429,779 B2* | 8/2022 | Li | G06F 40/47 |
| 11,463,500 B1* | 10/2022 | Shevchenko | G06F 40/174 |
| 11,475,211 B1* | 10/2022 | Baughman | G06F 40/253 |
| 11,475,223 B2* | 10/2022 | Chhaya | G06N 3/044 |
| 11,551,011 B2* | 1/2023 | Lev-Tov | G06F 40/30 |
| 11,562,148 B2* | 1/2023 | Lev-Tov | G06F 18/2155 |
| 11,586,828 B2* | 2/2023 | Lev-Tov | G06F 40/30 |
| 11,620,566 B1* | 4/2023 | Shevchenko | G06F 16/27 706/12 |
| 11,630,959 B1* | 4/2023 | Dobranic | G06V 30/10 704/9 |
| 11,663,839 B1* | 5/2023 | Liachenko | G06F 40/30 382/189 |
| 11,727,198 B2* | 8/2023 | Olsen | G06F 40/166 715/256 |
| 11,727,205 B1* | 8/2023 | Shevchenko | H04N 7/147 715/200 |
| 11,734,509 B2* | 8/2023 | Mishra | G06F 40/151 704/9 |
| 11,748,555 B2* | 9/2023 | Tran | G06F 40/169 715/202 |
| 11,763,078 B2* | 9/2023 | Wilson-Thomas | G06F 40/274 715/816 |
| 11,763,085 B1* | 9/2023 | Alikaniotis | G06N 20/00 704/9 |
| 11,871,148 B1* | 1/2024 | Shevchenko | G06F 40/186 |
| 2005/0075880 A1* | 4/2005 | Pickover | G06F 40/253 704/270 |
| 2011/0313756 A1* | 12/2011 | Connor | G06F 40/253 704/9 |
| 2013/0253910 A1* | 9/2013 | Turner | G06F 40/10 704/9 |
| 2014/0088944 A1* | 3/2014 | Natarajan | G06Q 30/02 703/13 |
| 2015/0242391 A1* | 8/2015 | Goel | G06F 40/30 704/9 |
| 2017/0220535 A1* | 8/2017 | Olsen | G06F 40/166 |
| 2017/0220536 A1* | 8/2017 | Chiba | G06F 9/453 |
| 2018/0067912 A1* | 3/2018 | DeLuca | G06F 40/166 |
| 2018/0211265 A1* | 7/2018 | Natarajan | G06Q 30/0202 |
| 2018/0341637 A1* | 11/2018 | Gaur | G06F 40/211 |
| 2018/0373697 A1* | 12/2018 | Jain | G06F 40/253 |
| 2019/0065452 A1* | 2/2019 | DeLuca | G06F 40/258 |
| 2019/0108212 A1* | 4/2019 | Cunico | G06F 40/253 |
| 2019/0108213 A1* | 4/2019 | Cunico | G06F 40/253 |
| 2019/0115008 A1* | 4/2019 | Jiang | G10L 15/22 |
| 2019/0121842 A1* | 4/2019 | Catalano | G06F 40/247 |
| 2019/0377785 A1* | 12/2019 | N | G06F 40/20 |
| 2019/0392813 A1* | 12/2019 | Jiang | G10L 13/047 |
| 2020/0057798 A1* | 2/2020 | Ragan, Jr. | G06F 40/166 |
| 2020/0110797 A1* | 4/2020 | Melnyk | G06F 40/30 |
| 2020/0134089 A1* | 4/2020 | Sankaran | G06N 3/045 |
| 2020/0159826 A1* | 5/2020 | Lev Tov | G06F 40/35 |
| 2020/0311195 A1* | 10/2020 | Mishra | G06F 40/253 |
| 2020/0321085 A1* | 10/2020 | Kartoun | G16H 50/20 |
| 2020/0327189 A1* | 10/2020 | Li | G06F 40/56 |
| 2020/0364303 A1* | 11/2020 | Liu | G10L 15/16 |
| 2020/0387674 A1* | 12/2020 | Lev-Tov | G06F 40/35 |
| 2020/0410171 A1* | 12/2020 | Lev-Tov | G06F 40/30 |
| 2020/0410172 A1* | 12/2020 | Lev-Tov | G06F 40/284 |
| 2021/0004432 A1* | 1/2021 | Li | G06F 40/295 |
| 2021/0034705 A1* | 2/2021 | Chhaya | G06F 40/205 |
| 2021/0117618 A1* | 4/2021 | Mishra | G06N 3/088 |
| 2021/0157880 A1* | 5/2021 | Verma | G06F 40/166 |
| 2021/0303803 A1* | 9/2021 | Wu | G06N 3/08 |
| 2021/0326528 A1* | 10/2021 | Kemp | H04L 67/306 |
| 2021/0397793 A1* | 12/2021 | Li | G06F 40/166 |
| 2022/0027577 A1* | 1/2022 | Duan | G06F 40/42 |
| 2022/0237368 A1* | 7/2022 | Tran | G06N 20/00 |
| 2022/0327947 A1* | 10/2022 | Cepuran | G06F 40/30 |
| 2022/0358286 A1* | 11/2022 | Wilson-Thomas | G06F 3/0482 |
| 2022/0391584 A1* | 12/2022 | Klein | G10L 15/005 |
| 2023/0066233 A1* | 3/2023 | van Dam | G06F 40/289 |
| 2023/0081879 A1* | 3/2023 | Tan | G06F 16/355 704/9 |
| 2023/0123574 A1 | 4/2023 | Guberman et al. | |
| 2023/0137209 A1* | 5/2023 | Nangi | G06F 40/216 704/9 |
| 2023/0153546 A1* | 5/2023 | Peleg | G06F 3/0482 704/9 |
| 2023/0177257 A1* | 6/2023 | Peleg | G06F 40/211 715/255 |
| 2023/0186017 A1* | 6/2023 | Peleg | G06F 40/211 715/271 |
| 2023/0196003 A1* | 6/2023 | Peleg | G06F 40/58 715/271 |
| 2023/0252224 A1* | 8/2023 | Tran | G06F 40/56 715/256 |
| 2023/0259713 A1* | 8/2023 | Religa | G06F 40/253 704/9 |
| 2023/0281398 A1* | 9/2023 | Peleg | G06F 3/0482 704/9 |
| 2023/0289529 A1* | 9/2023 | Alikaniotis | G06F 40/211 |
| 2023/0297766 A1* | 9/2023 | Mackey | G06F 16/35 715/255 |
| 2023/0325590 A1* | 10/2023 | Shevchenko | G06N 5/04 715/200 |
| 2023/0325610 A1* | 10/2023 | Peleg | G06F 40/211 704/9 |
| 2023/0351102 A1* | 11/2023 | Tran | G06N 3/045 |
| 2023/0376685 A1* | 11/2023 | Wilson-Thomas | G06F 3/04842 |
| 2024/0054282 A1* | 2/2024 | Baughman | G06F 40/253 |

OTHER PUBLICATIONS

Anonymous, Google Cloud, "Dataflow" https://cloud.google.com/dataflow, retrieved Mar. 22, 2023, 16 pages.

Anonymous, "Introduction to TensorFlow" https://www.tensorflow.org/learn, retrieved Mar. 22, 2023, 9 pages.

Grammarly, Inc. "How Grammarly's Product Works" https://www.grammarly.com/how-grammarly-works, retrieved Mar. 22, 2023, 11 pages.

Facebook Inc. "Text classification" https://fasttext.cc/docs/en/supervised-tutorial.html, retrieved Apr. 11, 2023, 11 pages.

(56) References Cited

OTHER PUBLICATIONS

Facebook Inc. "Word representations" https://fasttext.cc/docs/en/unsupervised-tutorial.html, retrieved Apr. 11, 2023, 11 pages.

* cited by examiner

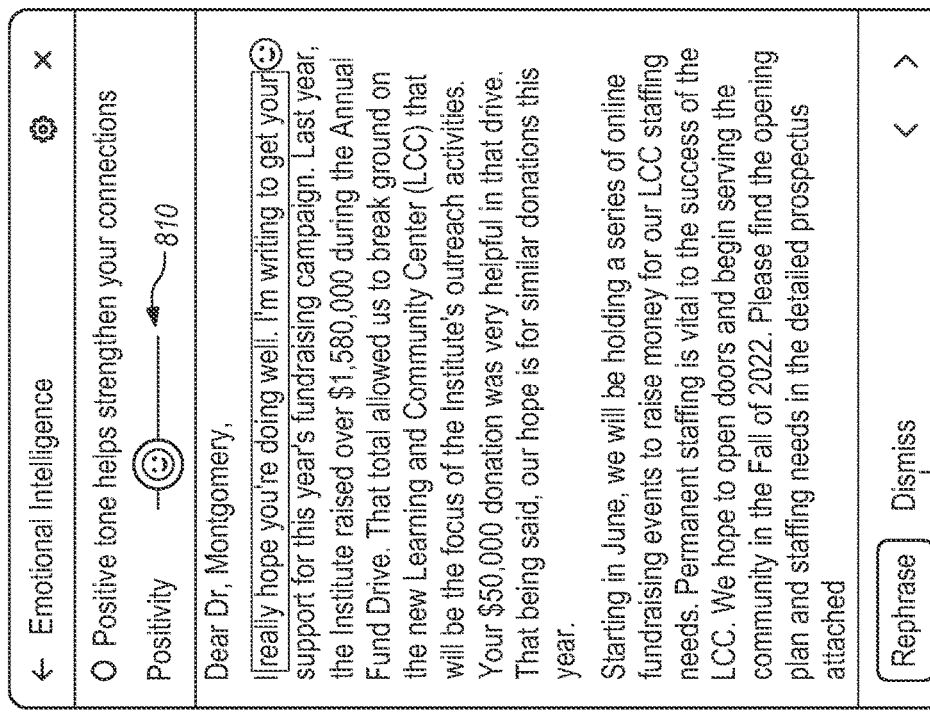
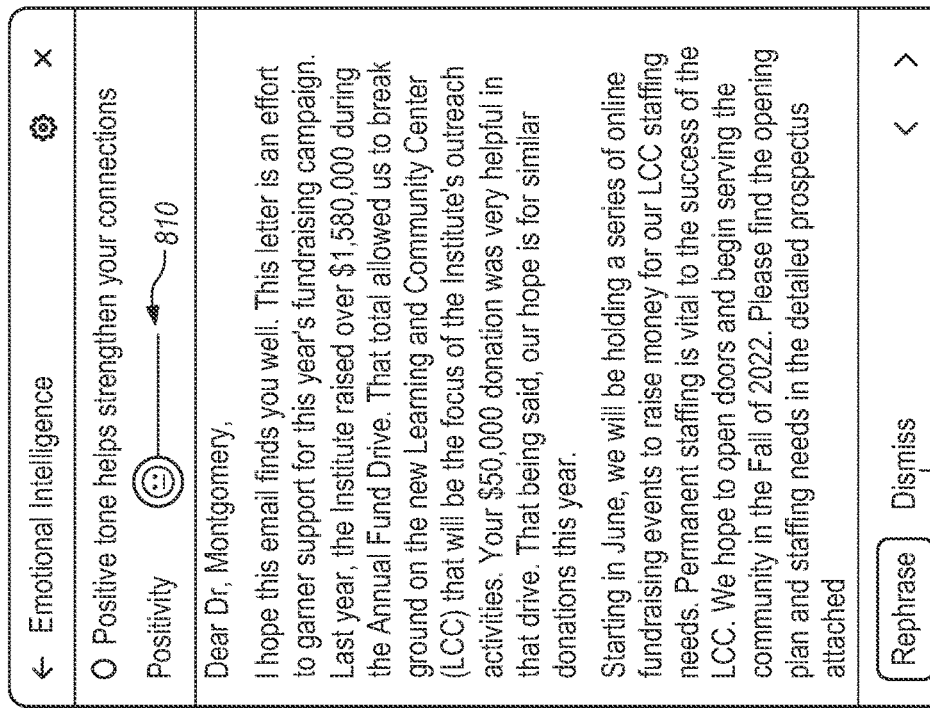
FIG. 8B
FIG. 8A

US 12,333,247 B1

AUTOMATICALLY APPLYING CORRECTION SUGGESTIONS IN TEXT CHECKING

BENEFIT CLAIM

This application claims the benefit under 35 U.S.C. § 119(e) of provisional application 63/321,214, filed 18 Mar. 2022, the entire contents of which is hereby incorporated herein by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Grammarly, Inc.

TECHNICAL FIELD

One technical field of the present disclosure is computer-implemented natural language processing. Another technical field is natural language text addition, modification or suggestion. The suggested CPC classification is G06F40/40 and G06N5/04.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-supported communications increasingly occur asynchronously through messaging or electronic mail (email). Particularly in work environments, people are also building relationships and getting jobs done via messaging or emails. One problem that people are facing with communications via messaging or emails is that such communications may impede productivity or the ability to deliver on their own promises and objectives. For example, some people may lack the ability to use proper tones for text for effective communication and relationship building.

Based on the foregoing, there is an acute need in the relevant technical fields for a computer-implemented, high-speed online system with real-time response capable of inspecting a draft text and enabling users to effectively modify the text to improve or supplement the original text automatically with respect to various filters. There is also is a need to provide text processing in a manner that makes it more effective in helping individuals in a team context to build relationship and get their work done.

SUMMARY

The appended claims may serve as a summary of the invention.

BRIEF DESCRIPTION OF THE DRAWINGS

In the drawings:

FIG. 8A, FIG. 8B, and FIG. 8C each illustrate an example of a graphical user interface that may be programmed to adjust the positivity of the tone filter.

DETAILED DESCRIPTION

Figure 1:
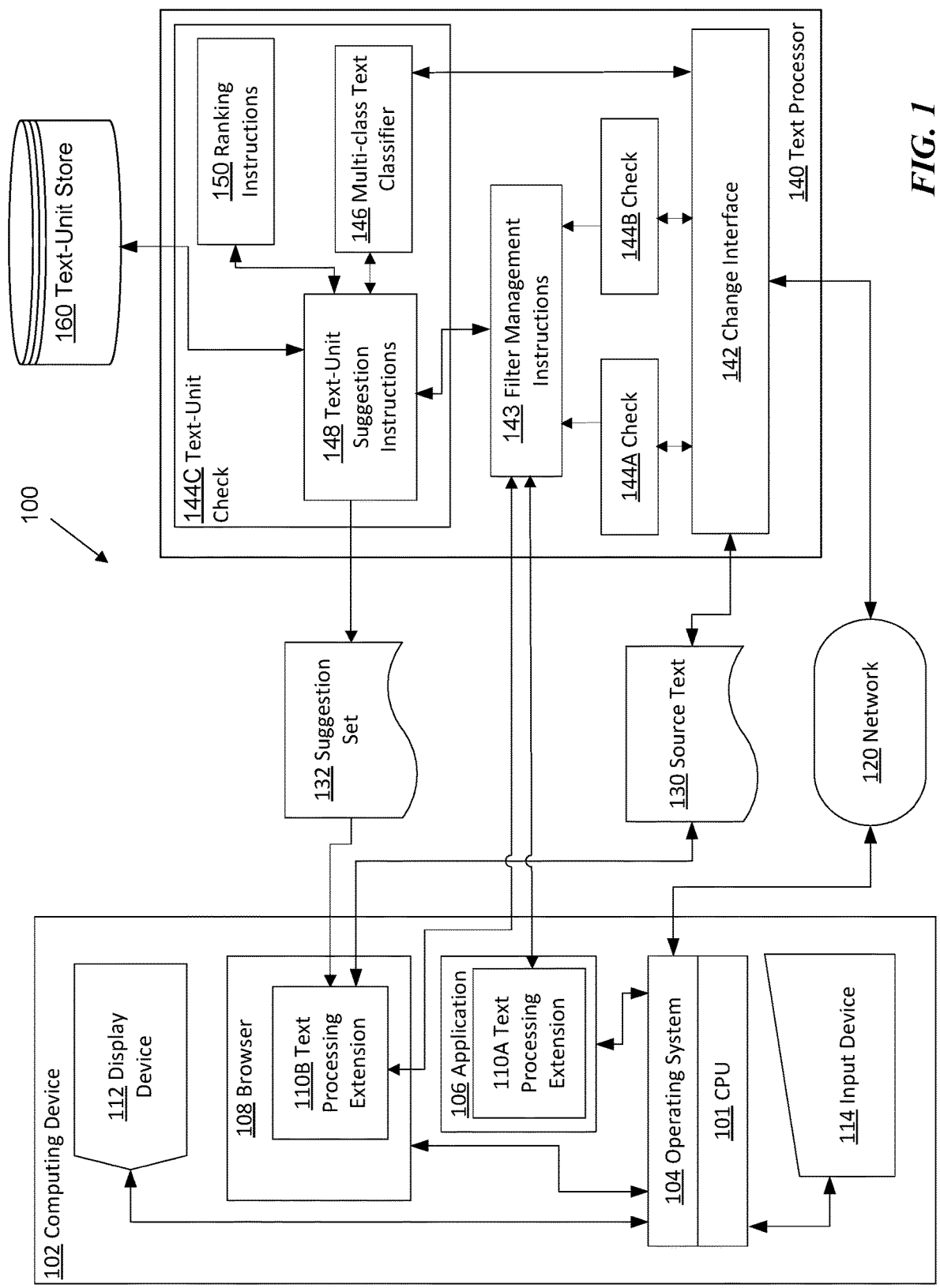
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview 1. General Overview In an embodiment, a computer-implemented process is programmed to provide a user with rapid, efficient access to one or more text filters to modify or update input text via a visual or graphical user interface. For example, in response to user selection of a filter using a link, button, or other graphical user interface widget, the computer-implemented process is programmed to request, receive, and display one or more suggestions to substitute for the original text. The filters may be based on one or more of correctness, clarity, tone, or transparency. Each filter may be associated with a slider control that is programmed to receive input specifying a magnitude or degree of change associated with the filter via graphical movement of the slider. In some embodiments, a single input operation using a pointing device, thus a single click, can signal the process to modify the text using all suggestions of one or more filters. The disclosed approach greatly improves the efficiency of applying multiple different filters and/or large numbers of suggestions by reducing the number of user input signals that are needed to specify acceptance or application of the filters or suggestions. Furthermore, the visual or graphical user interface is programmed to enable users to see what the change to the text will be and whether they want it before they engage with the suggestion.

In this context, a suggestion can refer to a change to one or more characters, words, phrases or sentences of the input text. Different sets of suggestions can correspond to different types of filters, and to different subtypes of filtering operations associated with a filter. In some embodiments, suggestions are generated using a text processing extension, which executes at a client computer as a browser extension or application extension, detecting changes to a text editing panel or window of a user application, sending the changes over a network to a text processor, the text processor being programmed to evaluate the changes using one or more checks that implement machine learning models, receiving the suggestions from the text processor after the evaluating with the machine learning models, and updating the panel or window to display and optionally highlight the suggestions.

In an embodiment, the disclosure provides a computer-implemented method executed at a first computer and comprising: programmatically receiving a digital electronic object, the digital electronic object comprising a source text having been composed at a second computer; sending, to the second computer, instructions for presenting one or more filters via a user interface, the one or more filters being programmed to adjust the source text when the filters are selected and executed, each of the filters being programmed to execute a different type of adjustment of the source text; receiving, from the second computer, a first input specifying a selection of a first filter of the one or more filters; generating an output set of two or more suggestions based on executing the first filter over the source text; transmitting the output set of suggestions to the second computer; and receiving, from the second computer, a second input specifying to apply the suggestions, and in response to the second input, automatically applying all the suggestions to the source text and transmitting, to the second computer, updated presentation instructions which when rendered using the second computer cause displaying an updated text with all the suggestions having been applied to the source text. In some embodiments, the computer-implemented method further comprises, before the transmitting, ranking the output set of suggestions based on a ranking criterion.

In some embodiments, each of the filters is programmed to execute a different type of adjustment of the source text which when executed causes the source text to be correct. In some embodiments, each of the filters is programmed to execute a different type of clarity adjustment of the source text which when executed causes the source text to be detailed, concise, or focused. In some embodiments, each of the filters is programmed to execute a different type of tone adjustment of the source text which when executed causes the source text to be neutral or exciting. In some embodiments, each of the filters is programmed to execute a different type of adjustment of the source text which when executed causes the source text to increase transparency. In some embodiments, each of the filters is programmed to execute a different type of applause adjustment of the source text which when executed causes the source text to sound optimistic, add warmth, or get personal. In some embodiments, each of the filters is programmed to execute a different type of tone adjustment of the source text which when executed causes an adjustment of tone-positivity of the source text.

In some embodiments, the computer-implemented method further comprises dividing the source text into a plurality of source text units; evaluating each particular source text unit among the plurality of source text units using a trained machine-learning model, and receiving a classification output from the trained machine-learning model that classifies each particular source text unit as a particular class among a plurality of possible classes, one or more classes of the plurality of possible classes corresponding to the one or more filters. In one feature, the generating of the output set of suggestions comprises identifying a first class corresponding to the first filter from the one or more classes; identifying one or more first source text units of the first class from the plurality of source text units; and transforming the one or more first source text units to the output set of suggestions. In one feature, the transforming comprises any one of: mapping the one or more first source text units to a plurality of candidate text-unit suggestions in a digital database, to yield an initial set of matching text-unit suggestions, and filtering the initial set of matching text-unit suggestions to yield the output set of suggestions; mapping the one or more first source text units to a plurality of candidate text-unit suggestions in a digital database, to yield an initial set of matching text-unit suggestions, scoring the candidate text-unit suggestions, and selecting top N candidate text-unit suggestions to yield the output set of suggestions.

In some embodiments, the trained machine-learning model comprises a multi-class text classifier. The machine learning model may be any of: a plurality of text classifiers coupled as an ensemble; a plurality of targeted rules that are programmed to find relevant words and coupled to a classifier to approve or reject whether an instance of a word is correct.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; the text processing extension executing in association with an application program that is executing at the second computer, the text processing extension being programmed to automatically detect a change in a text entry window of the application program and, in response, to initiate the message.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; the text processor executing in association with a browser that is executing at the second computer, the text processing extension being programmed to automatically detect a change in a text entry widget of the browser and, in response, to initiate the message.

2. Structural & Functional Overview

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

At runtime, one or more of application 106 and browser 108 load, or are installed with, a text processing extension 110A, 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical provided that an extension is compatible with and can be functionally integrated with a host application 106 or browser 108.

In some embodiments, a text processing extension 110A may install as a stand-alone application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein. As another example, another embodiment can call an accessibility API that obtains input speech of the user from the application 106 and transcribes the speech to input text.

In some embodiments, each text processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing extensions 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing extension 110B is programmed to detect user selection of the text entry panel, the entry of text or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

In some embodiments, each of the text processing extensions 110A, 110B is linked, loaded with, or otherwise programmatically coupled to or with a user interface for presenting one or more filters a user can select to modify the entered text within the panel and receiving a selection of a filter from the user. As an example, the user interface may comprise a filter panel. The filter panel may display different filters and their corresponding descriptions of how the text would change after the filters are applied. As another example, the user interface may further comprise a slider for a filter. The user can drag the slider left and right to adjust the degree of the corresponding filter.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or internetworks in any combination, using any of terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and text processing extensions 110A, 110B may execute at a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. To illustrate a clear example, source text 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processing extension that is executed at the second computer and programmatically receives the digital electronic object comprising the source text via a message initiated at the text processing extension and transmitted to the text processor; and/or the text processing extension executes in association with an application program that is executing at the second computer, the text processing extension being programmed to automatically detect a change in a text entry window of the application program and, in response, to initiate the message; and/or the text processor executes in association with browser that is executing at the second computer, the text processing extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a text-unit check, and therefore it is also denoted "text-unit check 144C" in this description. In one embodiment, one example of a text unit is a phrase. Other text units may be used in other embodiments include words, clauses, sentences, multi-sentence groups, paragraphs, and so forth.

In an embodiment, text-unit check 144C comprises a multi-class text classifier 146 coupled to text-unit suggestion instructions 148, which are coupled to ranking instructions 150; however, other machine-learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by machine-learning based filtering.

In an embodiment, text-unit check 144C is coupled to or can access, a text-unit store 160, which may be integrated with text processor 140 or implemented as separate storage. In an embodiment, text-unit store 160 comprises a database, flat file system, object store, or another digital data repository that stores a large number of textual text-unit suggestions, in association with category values or tags that specify a category or type of communication, text, or document in which the suggestions could be substituted. Thus, text-unit check 144C and/or text processor 140 may be programmed for evaluating each particular source text unit among the plurality of source text units using a trained multi-class text classifier machine-learning model and receiving a classification output from the multi-class text classifier that classifies each particular source text unit as a particular class of text unit among a plurality of possible classes of text units.

In an embodiment, text processor 140 comprises filter management instructions 143. The filter management instructions 143 are programmed to send instructions to text processing extensions 110A, 110B to present different filters the user can select, via a user interface. For example, the user interface may comprise a filter panel. The user interface is linked, loaded with, or otherwise programmatically coupled to each of the text processing extensions 110A, 110B. The filter management instructions 143 are programmed to also receive a selection of a filter by the user via the user interface and to transmit such filter selection to the text-unit suggestion instructions 148.

Figure 2:
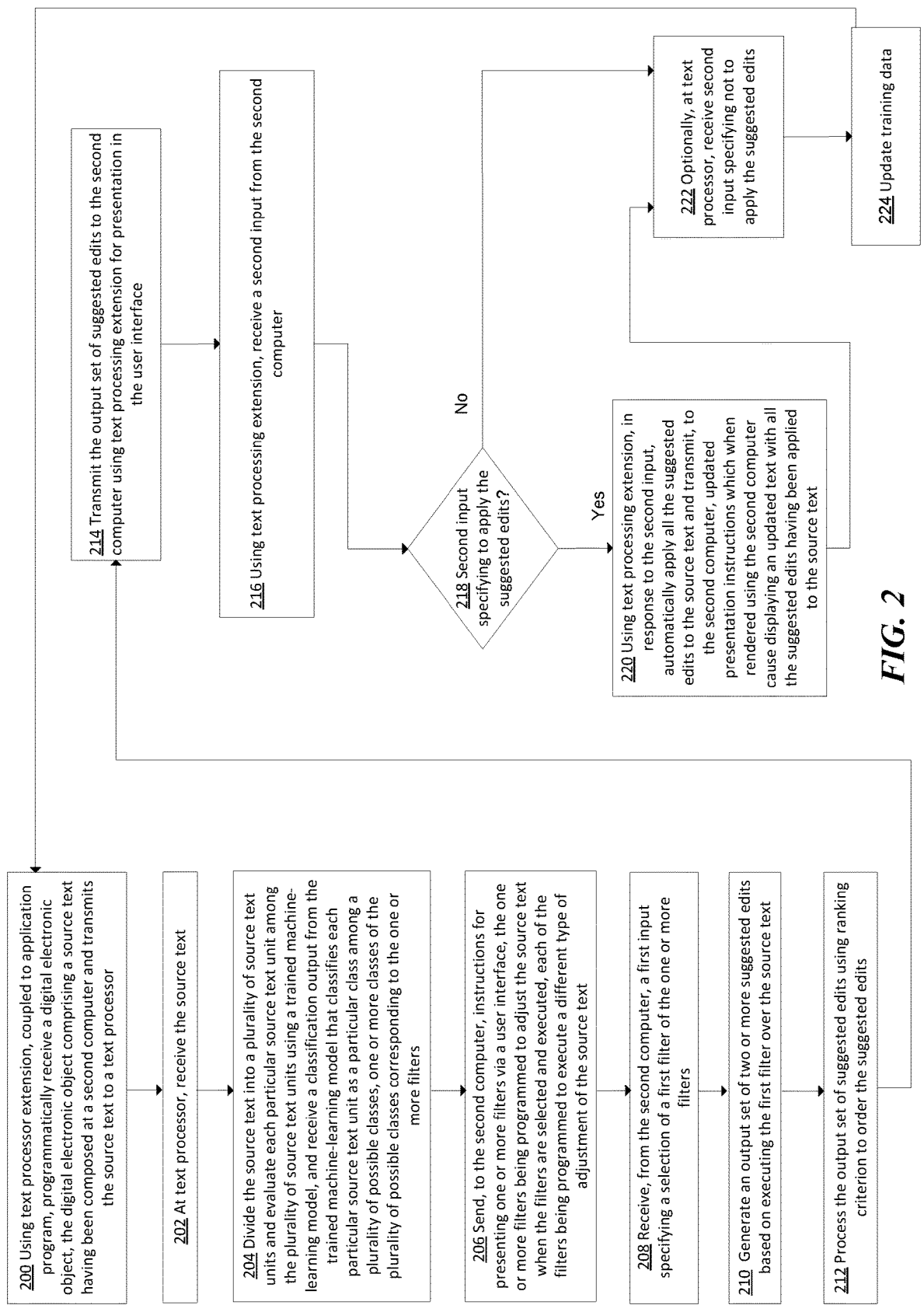
FIG. 2 illustrates a computer-implemented process of receiving a filter selection, determining suggestions based on the selected filter, and presenting the suggestions, in one embodiment.

As further described herein for FIG. 2, in an embodiment, text-unit suggestion instructions 148 are programmed, in part, to output a suggestion set 132 to transmit to text processing extension 110B.

FIG. 2 illustrates a computer-implemented process of receiving a filter selection, determining suggestions based on the selected filter, and presenting the suggestions, in one embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs. Portions of the process shown in FIG. 2 can be programmed for execution by text processing extensions 110A, 110B, and text-unit check 144C.

At step 200 of FIG. 2, in an embodiment, using a text processing extension coupled to an application program or browser, the process programmatically receives a digital electronic object, the digital electronic object comprising a source text having been composed at a second computer and transmits the text changes to a text processor. For example, as described for FIG. 1, each text processing extension 110A, 110B is programmed to transmit any change in the text to text processor 140. Thus, invocation of the process of FIG. 2 occurs in response to a user drafting text in application 106 (FIG. 1) or browser 108, based upon a text processing extension 110A, 110B detecting a change in source text 130 entered at the application or browser and transmitting the source text to change interface 142 of text processor 140 for evaluation using checks 144A, 144B, 144C.

At step 202, at the text processor, the source text is received. In some embodiments, the text processor 140 is implemented as a back-end server and is programmed to distribute the source text to a plurality of modules that are programmed to execute multiple types of checks on the text, and the process of FIG. 2 is implemented as one of the checks. For example, source text 130 is received at text-unit check 144C via change interface 142.

At step 204, the process is programmed to divide the source text into a plurality of source text units and evaluate each particular source text unit among the plurality of source text units using a trained machine-learning model, and receive a classification output from the trained machine-learning model that classifies each particular source text unit as a particular class among a plurality of possible classes, one or more classes of the plurality of possible classes corresponding to the one or more filters. One example of the source text unit is a sentence. The dividing may use a parser or other programmed algorithm capable of inspecting natural language text, identifying tokens or units of the text, identifying syntactic units, and so forth. Other text units may be used in other embodiments including clauses, multi-sentence groups, paragraphs, and so forth.

The machine-learning model, structured as a text classifier, is trained on a large corpus of source sentences and then used to evaluate each source text unit. For example, at step 204, the source text is submitted to a multi-class text classifier for evaluation. Referring to FIG. 1, source text 130 may be programmatically transmitted to multi-class text classifier 146. In one embodiment, text classifier 146 implements a multi-class machine-learning model capable of outputting a plurality of different label values, each label value representing a type or category each particular source text unit is associated with. In one experimental implementation, text classifier 146 has been programmed to support 9 types and to output, for each source text unit, label values of "1" to "9" which respectively correspond to correctness, formality, brevity, clarity, tone, conciseness, transparency, applause, and positivity.

In an embodiment, multi-class text classifier 146 may be programmed using the FASTTEXT model library authored by Facebook, Inc. In experimentation, the inventors determined that FASTTEXT, as supplied by FACEBOOK, does not generalize well without loss of precision when previously unseen labels are processed. In one experiment, FAST-TEXT was integrated into a working implementation via these steps:
1. Manually author a small set of target-like sentences.
2. Use Universal Sentence Encoder to find semantically related sentences from a large random text corpus.
3. Perform human annotation to validate the selected sentences in being truthful to the definition of target style.
4. Use the validated data as the training dataset for the FASTTEXT classifier.

In another experiment, acceptable results were obtained using FASTTEXT embeddings as a metric of semantic distance between training sentences and user-input sentences under evaluation. Various sources of data for training were evaluated, such as news headlines as a substitute for sentences indicating styles, and ultimately a training dataset of specific style samples was manually prepared and input.

As an alternative to FASTTEXT, a very deep convolutional neural network (VDCNN) can be used for training the machine-learning model. Experimental implementations also have used embedding of sentences with multiple feed-forward layers in a CNN. Further information about FAST-TEXT including documentation is published online at the time of this writing at the website "fasttext.cc", which is accessible using a browser via the protocol identifier "https://".

Referring again to FIG. 2, at step 206, the process is programmed to send, to the second computer, instructions for presenting one or more filters via a user interface, the one or more filters being programmed to adjust the source text when the filters are selected and executed, each of the filters being programmed to execute a different type of adjustment of the source text. As an example, the user interface may comprise a filter panel where the filters can be displayed to the user. In some embodiments, each of the filters is programmed to execute a different type of tone adjustment of the source text which when executed causes the source text to be neutral or exciting. In some embodiments, each of the filters is programmed to execute a different type of adjustment of the source text which when executed causes the source text to increase transparency. In some embodiments, each of the filters is programmed to execute a different type of applause adjustment of the source text which when executed causes the source text to sound optimistic, add warmth, or get personal. In some embodiments, each of the filters is programmed to execute a different type of tone adjustment of the source text which when executed causes an adjustment of tone-positivity of the source text.

At step 208, the process is programmed to receive, from the second computer, a first input specifying a selection of a first filter of the one or more filters. As an example, the selection of the first filter may be via the filter panel of the user interface. In response to the received first input, the process of FIG. 2 is programmed to determine that suggestions should be given.

At step 210, the process is programmed to generate an output set of two or more suggestions based on executing the first filter over the source text. In one approach for generating the output set of suggestions, text-unit check 144C is programmed to form vectors that represent text units of the particular class corresponding to the first filter and the surrounding context of source text 130, then search for matching vectors in a labeled dataset that is digitally stored in text-unit store 160. The matching may use fuzzy similarity algorithms. The dividing may use a parser or other programmed algorithm capable of inspecting natural-language text, identifying tokens or units of the text, identifying syntactic units, and so forth.

Alternatively, a machine-learning model, structured as a text classifier, is trained on a large corpus of source text units and then used to evaluate a current text unit, outputting a classification of where to inject a suggestion. In this approach, the generating of the output set of suggestions comprises identifying a first class corresponding to the first filter from the one or more classes; identifying one or more first source text units of the first class from the plurality of source text units; and transforming the one or more first source text units to the output set of suggestions.

Text-unit store 160 digitally stores a plurality of different text units including words, sentences, clauses, multi-sentences, or phrases, each stored in association with a label value corresponding to one or more of the label values that text classifier 146 can output. Text-unit store 160 may use relational database tables, non-relational tables, flat files, or other forms of digital data storage to store text units with label values. In some embodiments, the text units are manually prepared and manually labeled. For example, analytical linguists or copywriters can draft high-quality phrase suggestions for storing in text-unit store 160.

Additionally or alternatively, text units may be synthesized, or generated programmatically, under stored program control by using a sentence similarity processor to receive an input text unit and to generate output synthetic data for text-unit store 160. For example, text semantic similarity can be processed using open-source software available from GOOGLE using TENSORFLOW HUB and DATAFLOW. Furthermore, similar programmatic techniques may be used to synthesize a plurality of text units to supplement a training dataset with which the text classifier 146 is trained.

Referring again to FIG. 2, at step 210, the process is programmed to map the classification output to an initial set of matching text-unit suggestions, for example, in a plurality of candidate text-unit suggestions that are stored in a digital database such as text-unit store 160. Thus, after detection of qualifying text units in source text 130, the process determines which text unit to suggest, selected from a large plurality of candidate text-unit suggestions in text-unit store 160. Step 210 may include generating and submitting a query to text-unit store 160 to select a result set of all stored text units having label values that match an output label value from text classifier 146.

However, the result set may contain too many candidate text units to present in a user interface of the application 106 or browser 108 (FIG. 1). Therefore, in an embodiment, at step 212, the process is programmed to process the output set of suggestions using ranking criterion to order the suggestions. The process may be programmed to further filter or reduce the text-unit suggestions to a reduced-size set, comprising an output set of text-unit suggestions that is fewer in number than the initial set. In some embodiments, filtering is executed first, for example, to select the first five or ten candidate text units from the result set, and then ranking is used. Alternatively, filtering to five or ten candidate text units can be executed without ranking.

In some embodiments, approaches other than mapping followed by filtering may be used at step 210 and step 212. For example, instructions may be programmed to score the candidate text-unit suggestions, for example, using an ELASTICSEARCH information retrieval score, and to select the top N candidates, without a need for a filtering step. The value "N" may vary in different embodiments; example values are "1" to "10" or any integer within a range of "1" to "10".

The ranking instructions 150 may be programmed to rank the result set of text-unit suggestions according to any useful ranking criterion such as similarity to a source text unit, dissimilarity, popularity across a community of users, or other criteria. In one ranking approach, step 212 is programmed to order the result set of text-unit suggestions in inverse order of similarity to the source text 130. Ordering in inverse order of similarity can avoid presenting, to the user, a suggestion that is too similar to the source text 130. To support this step, in an embodiment, the result set of candidate text units obtained at step 210 can be submitted in real-time to a text-unit similarity processor to receive, in return, a similarity value for each candidate text unit that reflects a degree of similarity to the source text 130. Or, ranking instructions 150 may be programmed to calculate, in real-time, a set similarity value between n-grams that are present in source text 130 and each candidate text unit of the result set; the result set similarity values may be programmatically provided to text-unit suggestion instructions 148 for presentation, in suggestion set 132, in order of lowest similarity first. The result set of candidate text-unit suggestions received from text-unit store 160 may comprise multiple similar variants. Examples include "thank you so much" and "thank you very much".

In an embodiment, the effect of ranking instructions 150 when programmed as just described is to avoid placing such similar variants in suggestion set 132 so that variants are near to one another in order when presented in the application 106 or browser 108 via the text processing extensions 110A, 110B. To enhance this effect, ranking instructions 150 and/or text-unit suggestion instructions 148 may be programmed using a clustering approach. For example, candidate text-unit suggestions of the result set may be divided into a plurality of different groups by executing a clustering algorithm on the result set to result in grouping similar text-unit suggestions. One cluster might include all text units expressing applause, for example. Five or six clusters could be used, for example, and ranking instructions 150 and/or text-unit suggestion instructions 148 may be programmed to conduct ranking as previously described and then select the highest-ranked text unit from each cluster successively to form a final set of text-unit suggestions for output as the suggestion set 132.

In an embodiment, source text 130 may comprise a plurality of different text units each yielding different label values for different types or different categories when the text units are processed using the text classifier 146. In an embodiment, text-unit suggestion instructions 148 are programmed to generate text-unit suggestions only for a first label value that is initially output from text classifier 146 for a first text unit that is processed. Or, in an embodiment, the text classifier 146 is programmed to process all text units that are present in source text 130, resulting in outputting a plurality of different label values; text-unit suggestion instructions 148 may be programmed to select one label value, using pseudo-random selection, from among all the label values and then select candidate text-unit suggestions only for the selected single label value.

At step 214, the process is programmed to transmit the output set of suggestions to the second computer using text processing extension for presentation in the user interface, for example, at a mobile computing device or another computing device that hosts or executes the text processing extension. Step 214 may include filtering the initial set of matching text-unit suggestions, for example, to select only the top N matching text-unit suggestions, based on the ranking. N may have a range of values depending on the display capabilities of the mobile computing device or another computing device that hosts or executes the text processing extension or depending upon the size of a graphical user interface panel, widget, or another visual element in which the suggestions are to be displayed. In one embodiment, the range of N is from one to ten, but other ranges could be used in different embodiments and the specific value of N is not critical.

At this stage, the text processing extension, at the mobile computing device or another computing device, may be programmed to output a display of the output set of suggestions that have been received at the text processing extension via step 214. Output may comprise displaying a list of the suggestions, instantiating a window, panel, or widget within a graphical user interface, or similar visual output. The specific means of output is not critical provided that some means is provided to a user, of the mobile computing device or another computing device that hosts or executes the text processing extension, to view and consider whether to select one of the suggestions. As an example, in response to the first input at the second computer selecting a filter, a text processing extension 110A, 110B is programmed to instantiate and cause displaying a sub-window that comprises a plurality of output suggestions. The text processing extensions 110A, 110B may be programmed to use system calls, function calls, method calls, or other programmatic means to instantiate sub-windows and cause labels and data to be displayed. In an embodiment, each of the output suggestions is output as a selectable hyperlink which, when selected, causes the text processing extension 110A, 110B to execute a call to delete the source text unit 304 and to insert the selected output suggestion.

At step 216, the process is programmed to receive, using the text processing extension, a second input from the second computer. For example, the second computer may be the mobile computing device or the other computing device that hosts or executes the text processing extension. The second input may indicate either accepting or declining one or more of the suggestions, specifying that a particular suggestion was selected to add to the text. As an example, the second input may be based on input signals corresponding to labels "Accept" and "Decline", or input signals corresponding to any other suitable internal values identifying different input.

At step 218, the process is programmed to determine whether the second input specifies to apply the suggestions. If step 218 is FALSE or NO, then control transfers to step 222 at which, optionally, the text processor 140 may receive the second input specifying not to apply the suggestions, for example, a "Decline" signal. At step 224, the process may be programmed to update training data, used to train the multi-class text classifier, based on the second input. Thus, steps 218, 222, and 224 may form a feedback loop by which training data is continuously updated based on user input to indicate whether a particular suggestion was correct, or useful, or not.

If step 218 is TRUE or YES, then at step 220, the process is programmed to, using the text processing extension in response to the second input, automatically apply all the suggestions to the source text and transmit, to the second computer, updated presentation instructions which when rendered using the second computer cause displaying an updated text with all the suggestions having been applied to the source text. Applying all the suggestions may comprise, for example, the text processing extension programmatically invoking an API call, internal method, or other programmed function, of the browser or app that the text processing extension extends, to insert the suggestions into the source text, or to delete the original text units and insert the suggestions. Control then transfers to step 222, which is processed as described above.

The approaches disclosed herein provide efficient technical means for automatically updating a text that has been written responsive to a user's one-click access to various filters using computer support. Unlike past approaches, the filters for modifying a source text may be presented simultaneously as the user composes the source text and may be efficiently selected by the user with only one click. The selected filter is then used to drive automatic machine selection of candidate suggestions, with ranking if appropriate to eliminate candidate suggestions that are too similar to one another. An ancillary benefit is that the accuracy, tone, and clarity of written communication may be improved with computer assistance. The approaches herein provide efficient machine assistance to individuals who are not naturally strong writers in finding text that makes their draft text more effective in communication with others.

Figure 3A:
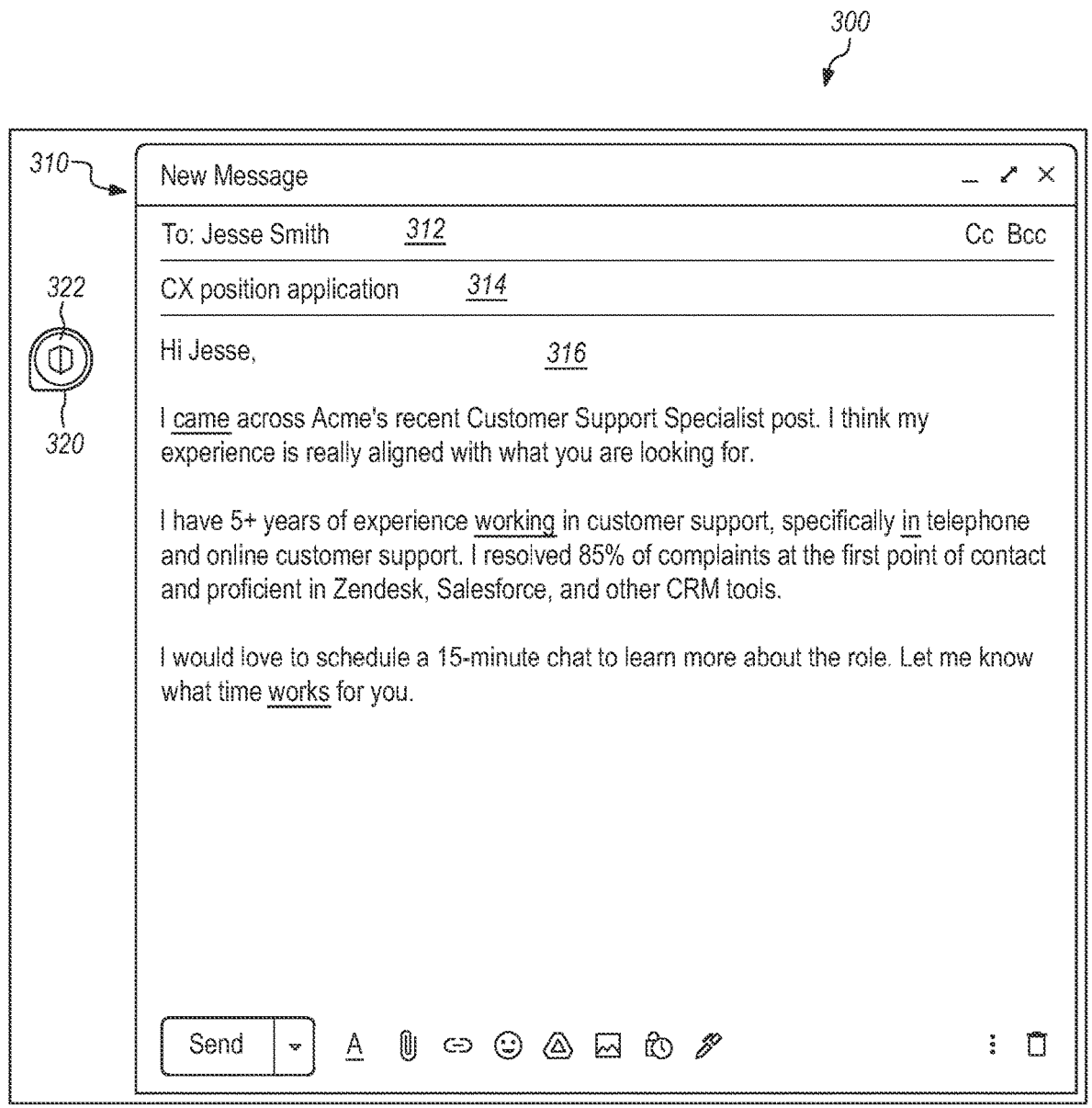
FIG. 3A illustrates an example of a graphical user interface that may be programmed to display a correctness filter in conjunction with an application.

FIG. 3A illustrates an example of a graphical user interface that may be programmed to display a correctness filter in conjunction with an application. In the example of FIG. 3A, a graphical user interface (GUI) window 300 is displayed as part of executing an application program, browser, or other program executed at a second computer, such as a mobile computing device. In an embodiment, an application running with GUI window 300 provides email composing functions and has instantiated a sub-window 310 which shows, in FIG. 3, a message that was composed by the user.

The sub-window 310 includes a Recipients list 312 specifying Jesse Smith, a subject 314 of "CX position application" in this example, and a content pane 316 comprising substantive content or text of an email that a user has composed. Beside the sub-window 310, in an embodiment, the extensions 110A, 110B are programmed to cause displaying a filter panel 320, in a collapsed format in this example, and comprising a button 322 for selecting a first filter. In this example, the first filter is a correctness filter, so a graphical appearance of button 322 can be configured to suggest a correctness function. The user can select the correctness filter with a single click on the button 322.

Figure 3B:
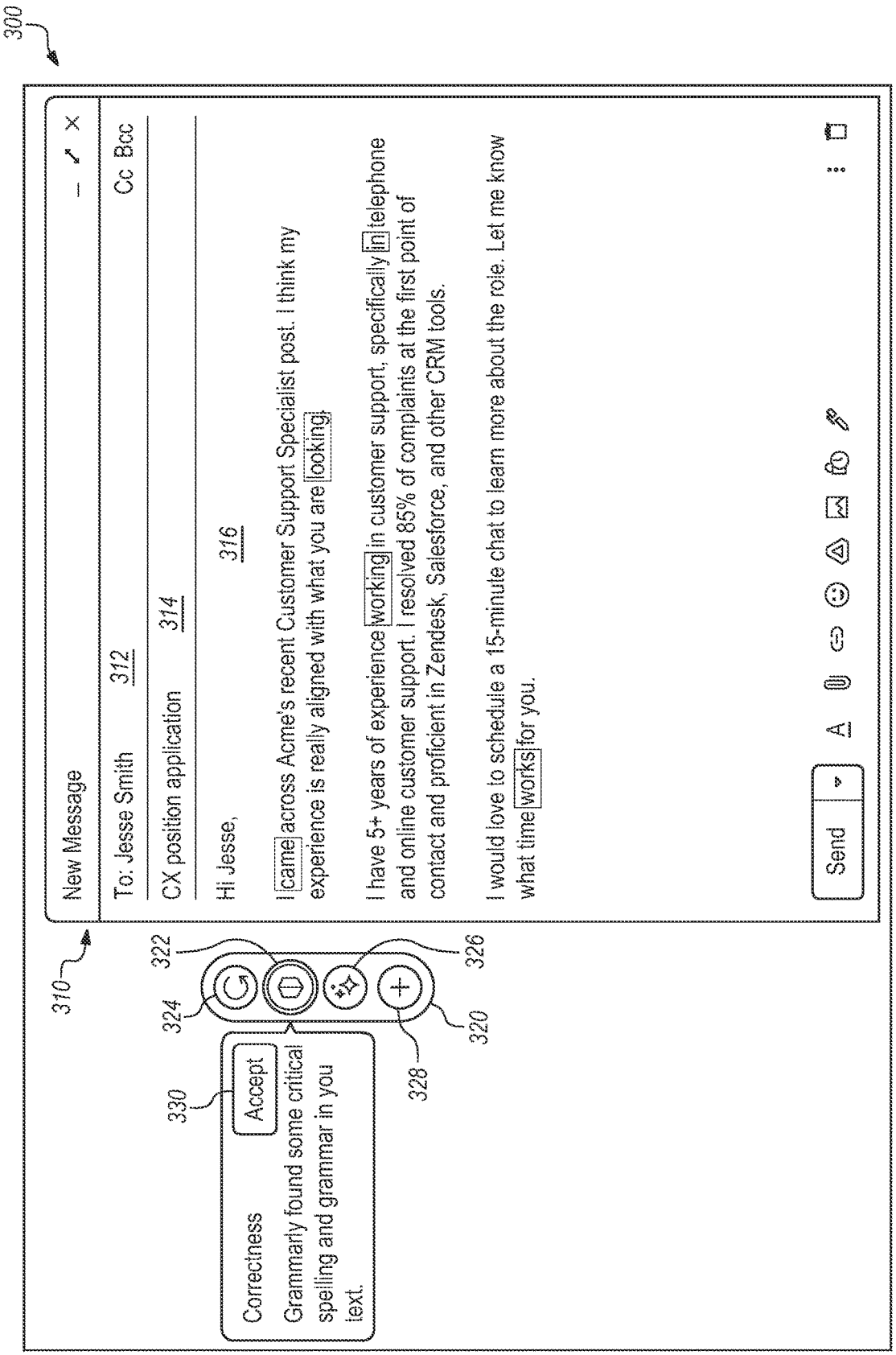
FIG. 3B illustrates an example of the graphical user interface displaying suggestions for the correctness filter.

FIG. 3B illustrates an example of the graphical user interface displaying suggestions for the correctness filter. In an embodiment, the user clicks on button 322 of FIG. 3A to select the correctness filter, extensions 110A, 110B are programmed to transmit a signal to the text processor 140, which may apply the correctness filter to the entire composed message.

In an embodiment, text processor 140 may be programmed to generate and display one or more suggestions concerning errors or changes in spelling and/or grammar in the text in the content pane 316, and to generate and display an alert or notification near the filter panel 320. In the example of FIG. 3B, execution of the correctness filter causes displaying a notification panel near the filter panel 320 with notification text such as: Correctness: Grammarly found some critical spelling and grammar in your text. In an embodiment, suggestions to change words or phrases are highlighted the content pane 316. In an embodiment, filter panel 320 is further programmed to generate and display a first button 324 that is programmed to cause reversing the application of a filter, a second button 326 that is programmed to invoke a second filter which can be a clarity filter, and a third button 328 that is programmed to invoke additional filters, which are not shown to ensure clarity.

The notification panel further comprises an ACCEPT widget 330. In an embodiment, after reviewing the highlighted words or phrases in content in message pane 316, the ACCEPT widget 330 can receive a selection to accept the specified modifications. The ACCEPT widget 330 can be implemented using active links, buttons, icons, or other UI elements that are programmed to generate signals to an extension, application, script, or server. Unlike prior approaches, which have required individual review and acceptance of each of the suggestions that are shown in the content in message pane 316, in an embodiment, selection of the ACCEPT widget 330 causes automatically accepting all of the suggestions that are shown in the message content and updating the message content to reflect the suggestions. Therefore, the ACCEPT widget and program code to implement it can provide far greater efficiency and speed to revise the content in message pane 316 than in prior approaches.

Figure 3C:
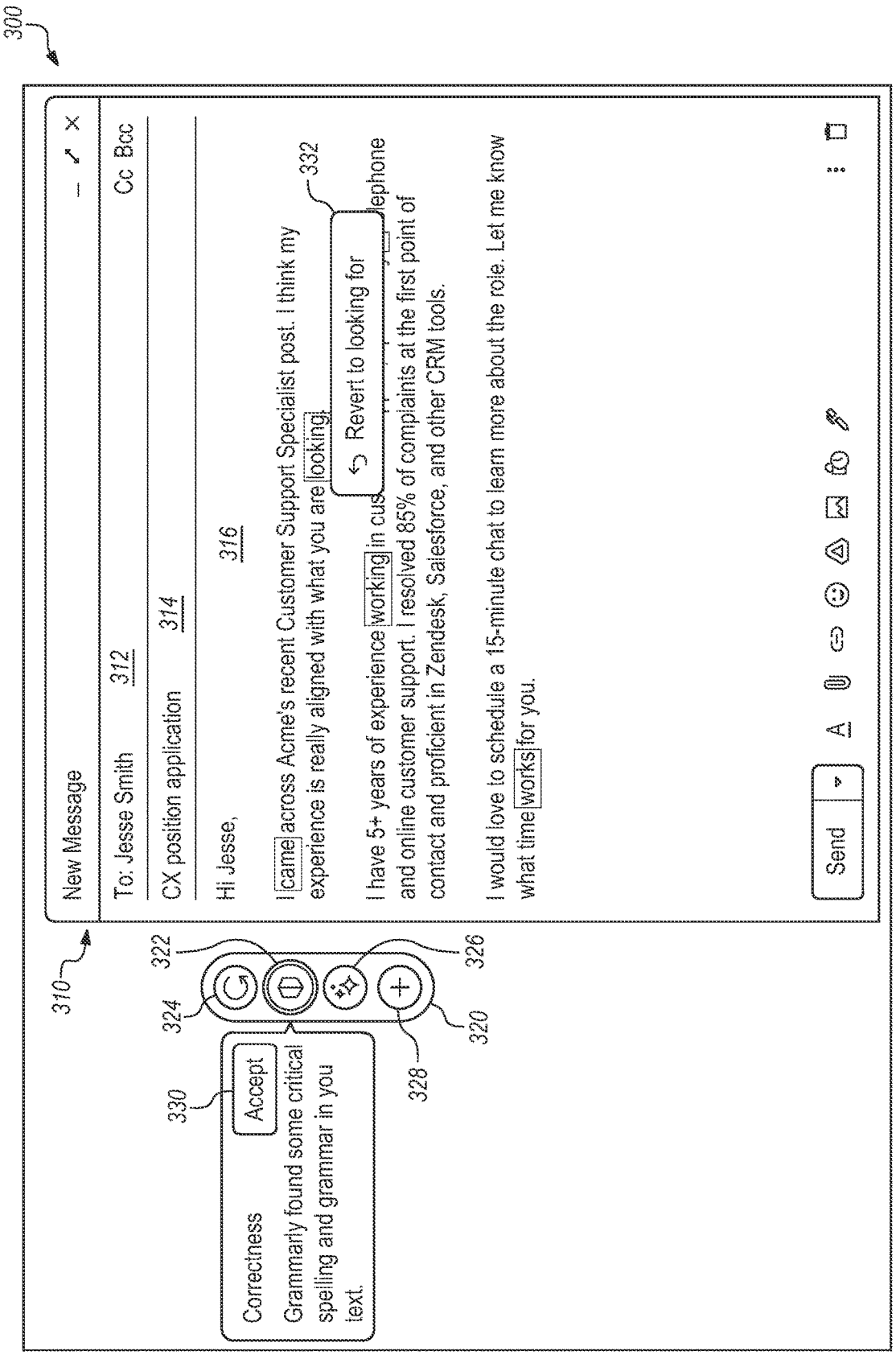
FIG. 3C illustrates an example of the graphical user interface displaying suggestions for the correctness filter with a reversing option.

FIG. 3C illustrates an example of a graphical user interface displaying suggestions based upon the correctness filter and with a reversing option. FIG. 3C has the same elements, in general, as FIG. 3B, except that FIG. 3C further comprises an active link 332 that prompts the user to reverse a suggestion that was previously given, to thereby revert a portion of the content in message pane 316 to the state that existed before the suggestions of FIG. 3B had been accepted. For example, after reviewing the highlighted words or phrases, the user could wish to revert to an earlier state of the text without applying some of the suggestions. In one example, in response to input signaling that a cursor is over the word "looking" in the content in message pane 316, extensions 110A, 110B may transmit signals specifying the position of the cursor, and in response, text processor 140 may return signals to the extensions 110A, 110B which when executed cause displaying the active link 332. In response to input specifying a selection of active link 332, text processor 140 may transmit updated content in message pane 316 in which the change of "looking for" is reversed.

In one embodiment, button 324 is programmed to receive input from the user and, in response, to reverse all the suggestions to the entire content in message pane 316 that had been implemented.

Figure 3D:
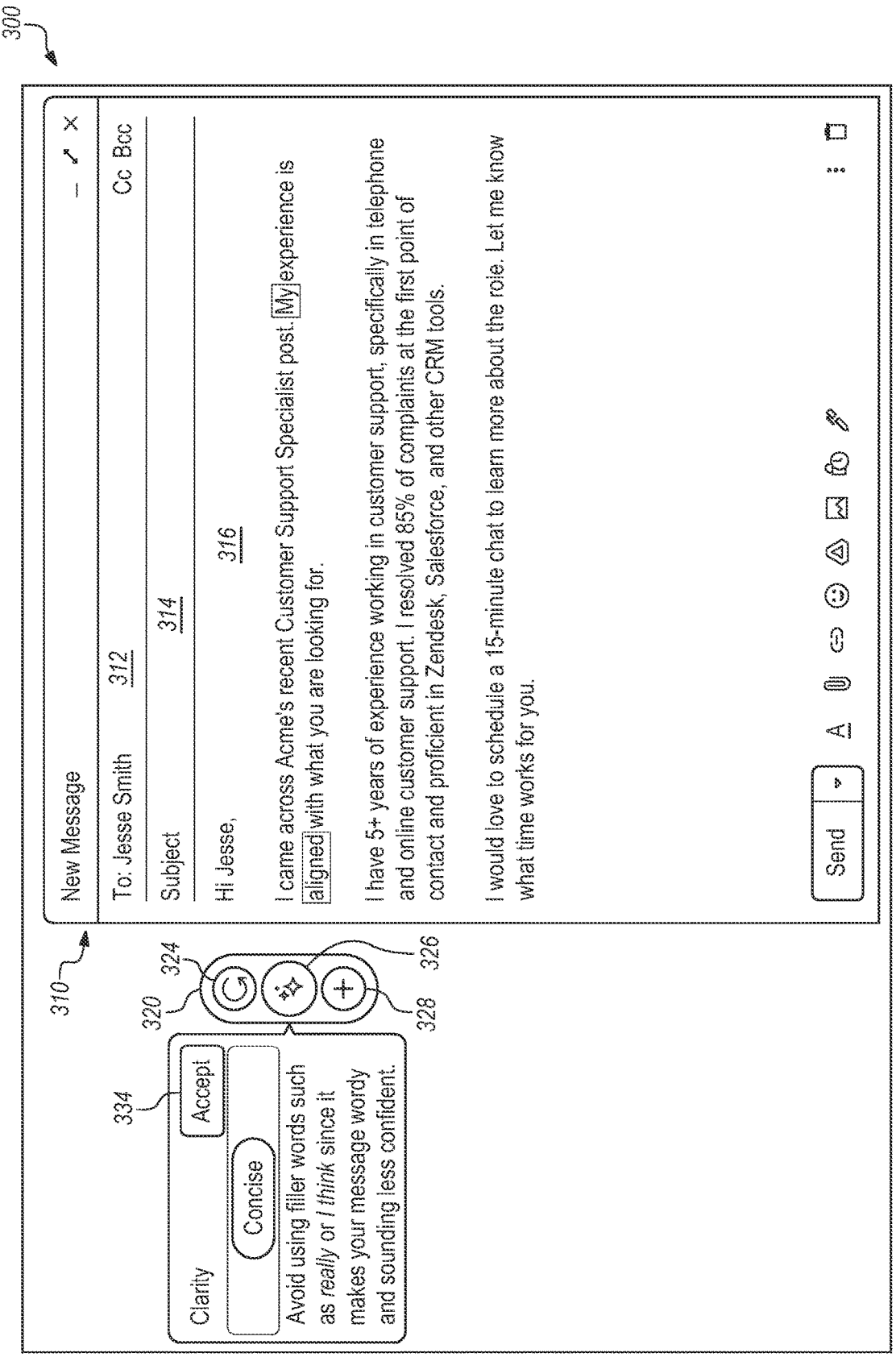
FIG. 3D illustrates an example of the graphical user interface displaying suggestions for the conciseness filter.

FIG. 3D illustrates an example of a graphical user interface displaying suggestions for a conciseness filter.

In an embodiment, in response to input signaling a selection of button 326, extensions 110A, 110B are programmed to cause generating a notification panel relating to the conciseness aspect of clarity. In an embodiment, in response to the same input, filter panel 320 is programmed to display one or more different notification panels, each associated with different clarity. For example, one level may have the label "detailed", another level may have the label "concise", and another level may have the label "focused".

In the example of FIG. 3D, user input has selected "concise," and text processor 140 as applied the conciseness filter to the entire content in message pane 316. Further, in the example of FIG. 3D, a notification panel shows: Clarity: Concise: Avoid using filler words such as REALLY or I THINK since it makes your message wordy and sound less confident. The text processor 140 can be programmed to interoperate with extensions 110A, 110B to highlight modified words or phrases by the filter in the content in message pane 316. In an embodiment, input signaling selection of ACCEPT link 334 can signal the acceptance of the modifications of FIG. 3B, optionally after review of the highlighted words or phrases.

Figure 3E:
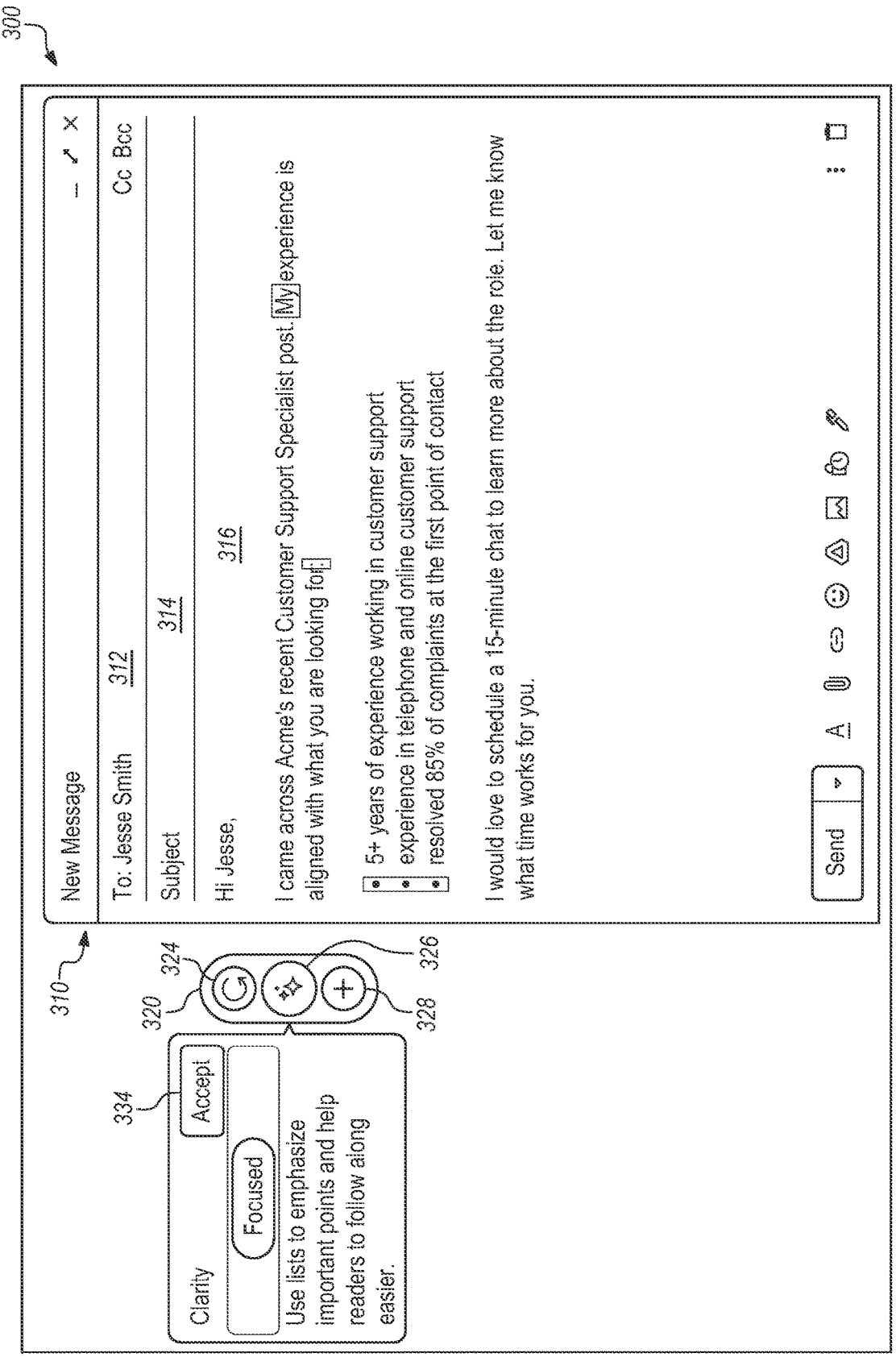
FIG. 3E illustrates an example of the graphical user interface displaying suggestions for the focused clarity filter.

FIG. 3E illustrates an example of a graphical user interface displaying suggestions a focused clarity filter. In FIG. 3E, user input has signaled a selection of "focused" to limit review of suggestions in content in message pane 316 to those suggestions for which the text processor 140 applied the focused clarity filter to the message content. Further, in the example of FIG. 3E, a notification panel shows: Clarity: Focused: "use lists to emphasize important points and help readers to follow along easier." In addition, the text processor 140 may highlight the suggestions for modified portions according to the specified filter in the content in message pane 316. After reviewing these highlighted portions, the user can select an ACCEPT link 334 to accept these suggestions of modifications.

Figure 4A:
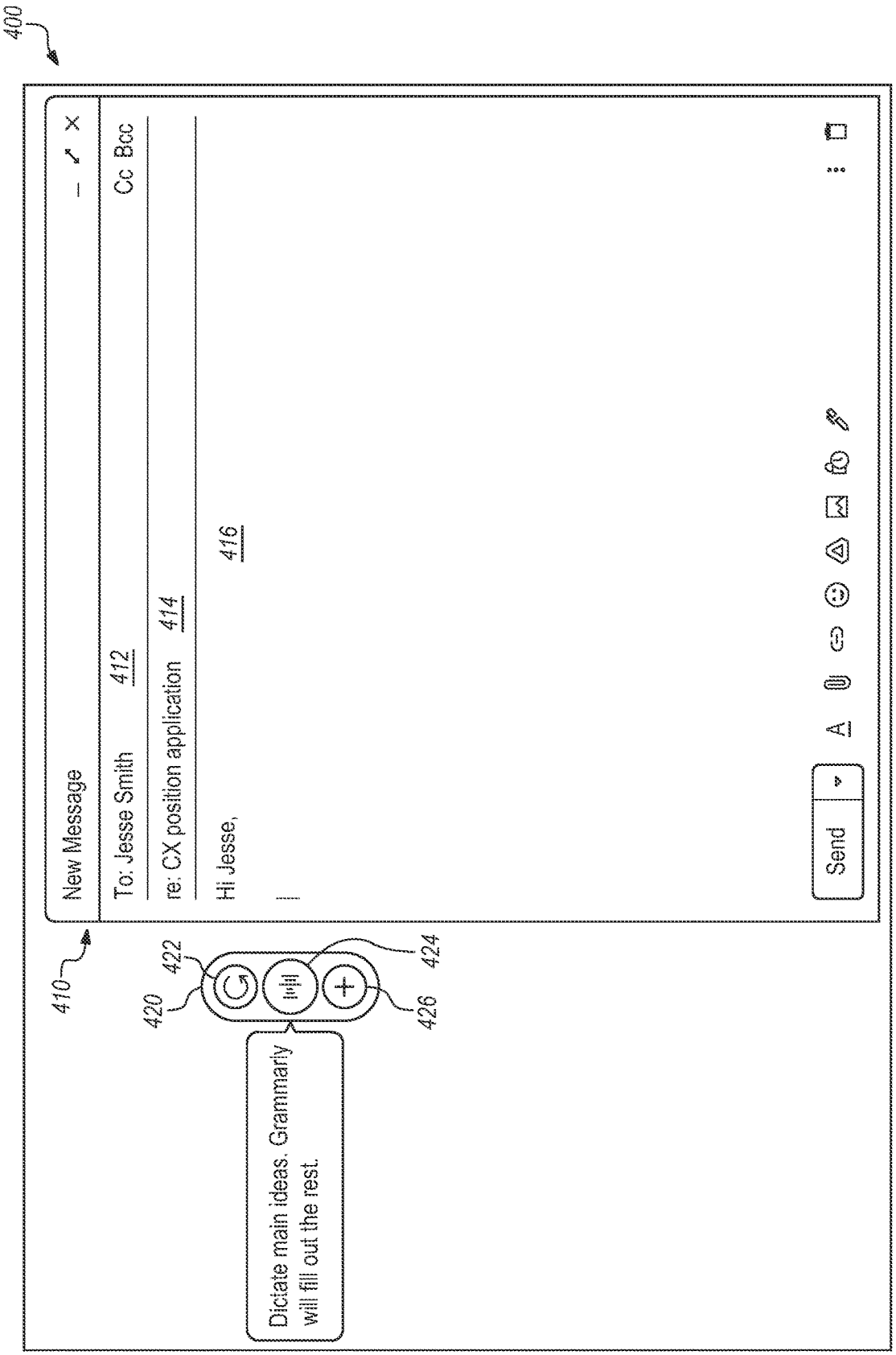
FIG. 4A illustrates an example of a graphical user interface that may be programmed to accept voice input in conjunction with an application.

FIG. 4A illustrates an example of a graphical user interface that may be programmed to accept voice input in conjunction with an application. In FIG. 4A, a graphical user interface (GUI) window 400 is displayed as part of executing an application program, browser, or other program executed at a second computer, such as a mobile computing device. In an embodiment, an application running with GUI window 400 provides email composing functions and has instantiated a sub-window 410. The sub-window 410 includes a Recipients field 412 showing user input specifying "Jesse Smith" as recipient, a subject field 414 in which user input has entered "CX position application" in this example, and a content pane 416 in which text of a message can be composed. In an embodiment, a filter panel 420 is generated and displayed near the content pane 416 and comprises a button 422 for reversing the application of a filter, a button 414 for initiating voice input or dictation, and a button 426 for accessing additional filters. A notification panel may be generated and displayed near button 414 and can comprise a prompt such as "Dictate main ideas. The system will fill out the rest." In an embodiment, in response to user input to select button 414, the extensions 110A, 110B are programmed to programmatically request access to a microphone or other sound input device of the user computer, to initiate listening for sound via the microphone, to transfer portions of digitized sound from the microphone programmatically to the text processor 140, to receive a response comprising text after the text processor has invoked a speech-to-text service to convert spoken speech to text and to modify the text, and to update the content pane 416 with the text. In an embodiment, machine learning models can be applied to the raw text resulting from the user's speech to generate suggestions of modified text for display in the content pane 416. Therefore, in an embodiment, the user can dictate main ideas using voice input and the text processor 140 can automatically generate other suggested text that completes or supplements the user's main ideas.

Figure 4B:
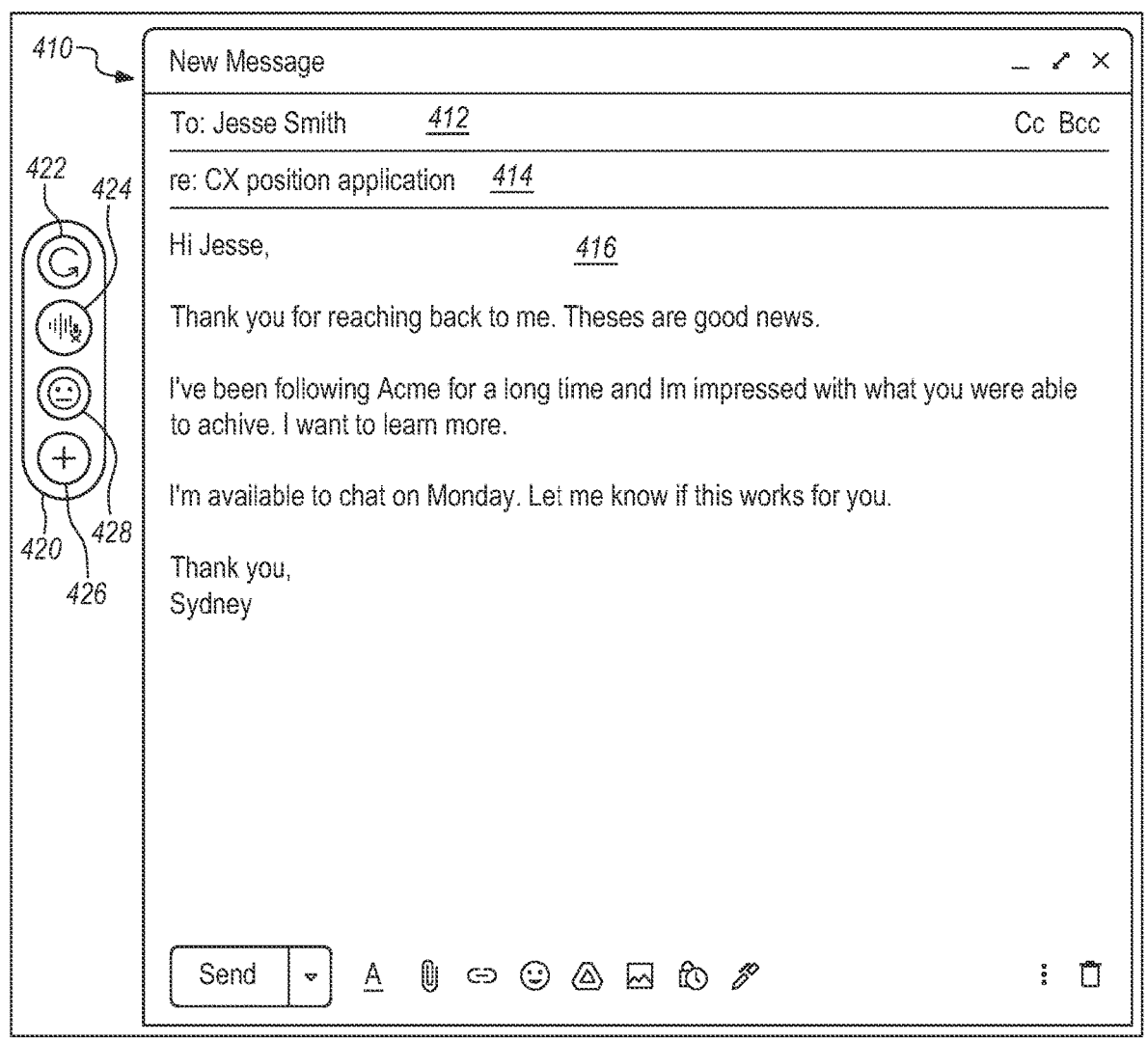
FIG. 4B illustrates an example of the graphical user interface displaying the message composed based on voice input.

FIG. 4B illustrates an example of the graphical user interface displaying a message that has been composed based on voice input. FIG. 4B has the same general format as FIG. 4A. In FIG. 4B, the content pane 416 has been updated under control of extensions 110A, 110B to display raw text of a message that has been composed via user speech or dictation, then converted to text using a speech-to-text service. Networked APIs from GOOGLE and other service providers can be called programmatically, using payloads consisting of portions of digitized speech received from the microphone of the user computer, to obtain converted text. Once the message is composed via dictation in this manner, user input can select elements of filter panel 420 for one-click access to different filters that apply different kinds of suggestions to the message. For example, FIG. 4B shows that the filter panel 420 comprises a button 428 that is programmed to receive user input to select a tone filter and show suggestions concerning tone in the content pane 416.

Figure 4C:
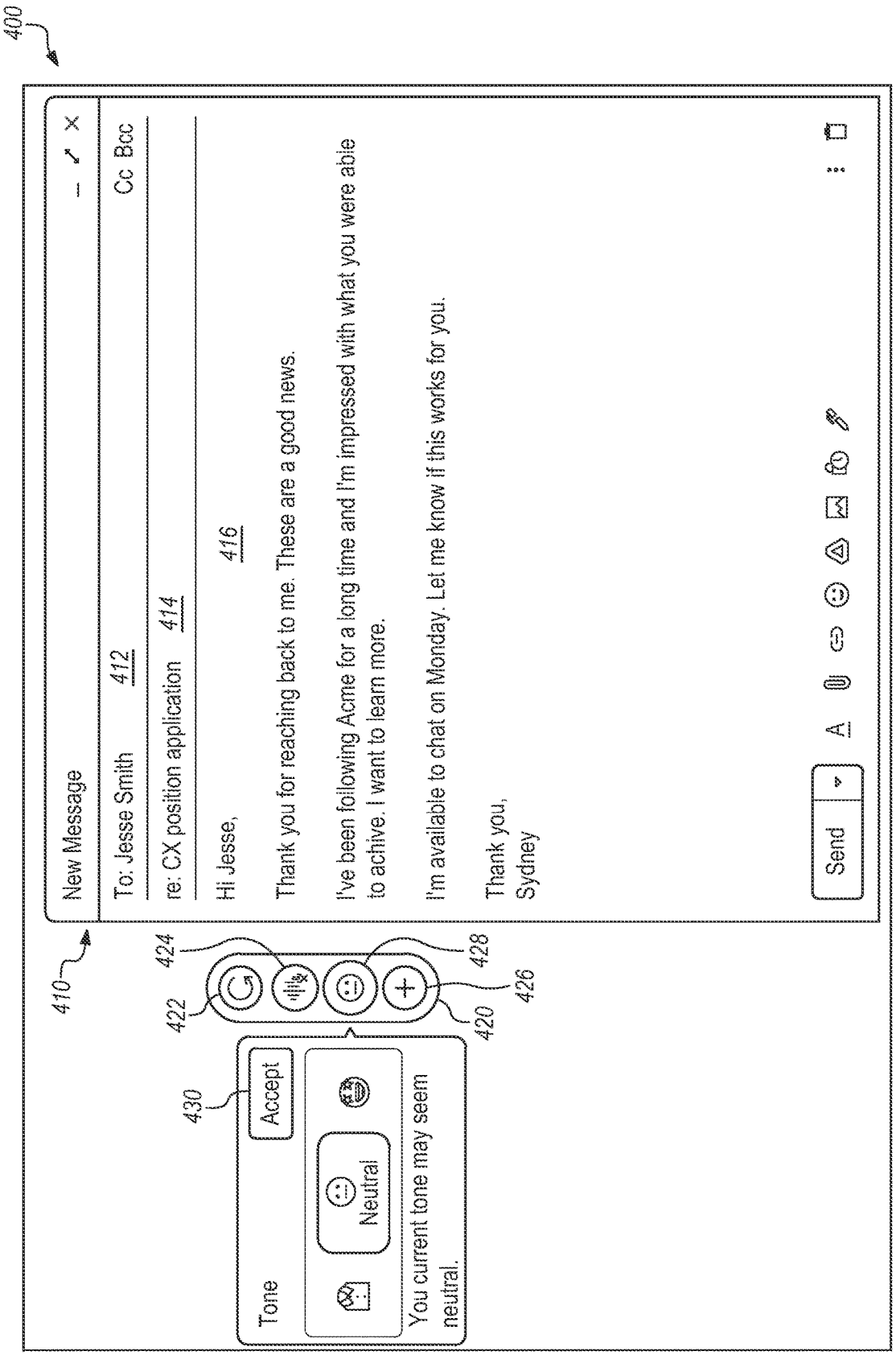
FIG. 4C illustrates an example of the graphical user interface displaying different tone-levels for the tone filter.

Assume that button 428 is selected via user input. In response, extensions 110A, 110B are programmed to cause generating and displaying updates to the user interface of FIG. 4B to provide further information about tone filtering. FIG. 4C illustrates an example of the graphical user interface displaying different tone levels for the tone filter. In an embodiment, user input to select button 428, extensions 110A, 110B are programmed to update the filter panel 420 to display a notification panel specifying a plurality of different tone levels, each identified using a label and selectable icon, which the user can select. In the example of FIG. 4C, a notification panel near button 428 specifies TONE and three (3) tone levels with icons. The extensions 110A, 110B are programmed to automatically highlight or emphasize one of the icons that corresponds to a tone of the text in the content pane 416; in the example of FIG. 4C, a NEUTRAL icon is highlighted and the notification panel includes an explanation such as "Your current tone may seem neutral." Other icons can be associated with other tone levels or types, such as "professional" or "exciting". In response to user input to select a different icon in the notification panel, extensions 110A, 110B are programmed to request the text processor 140 to process the text in content pane 416 using a different tone filter, to receive a set of suggestions that reflect the different tone filter, and to update the content pane to show the new suggestions.

Figure 4D:
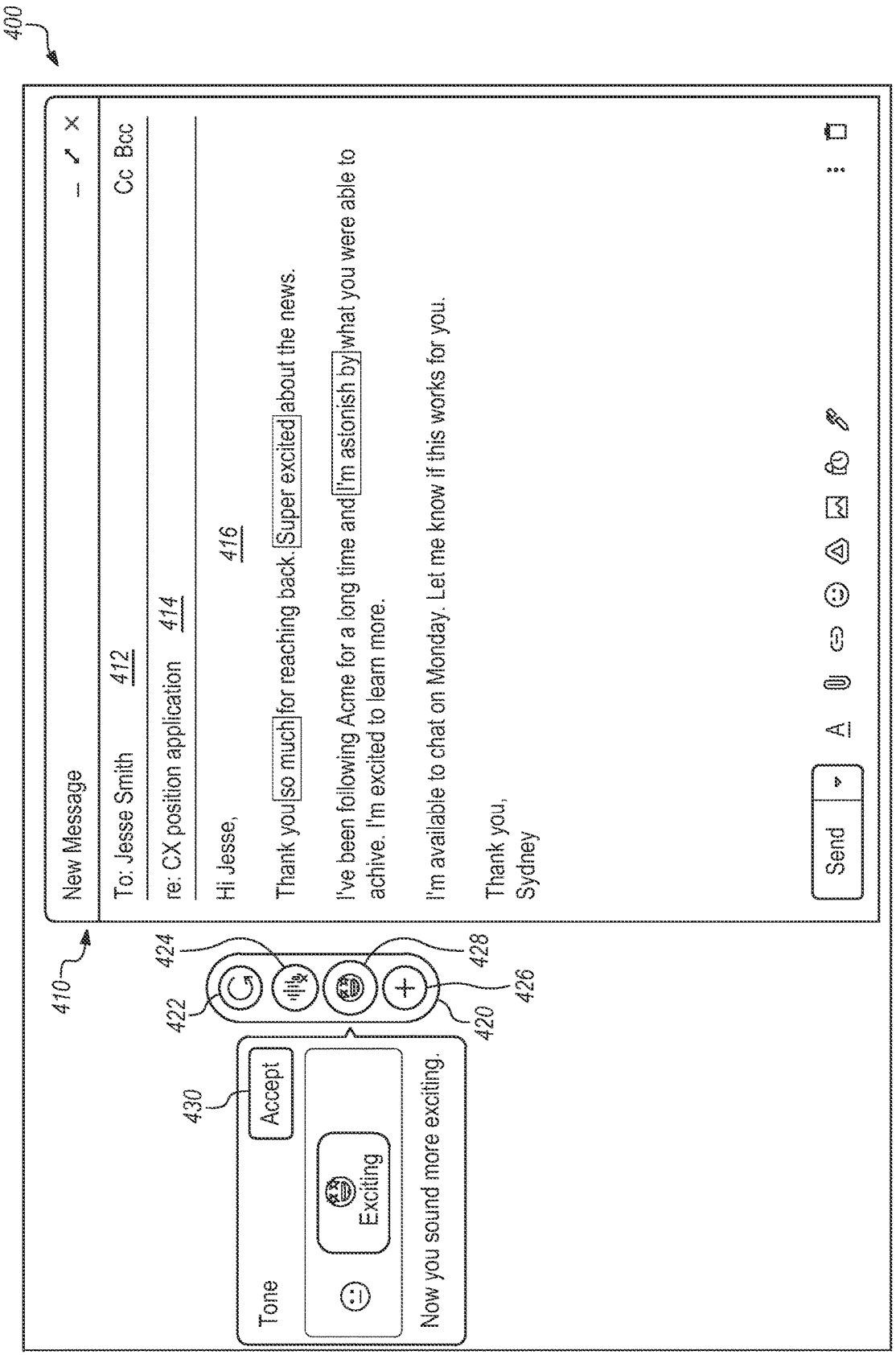
FIG. 4D illustrates an example of the graphical user interface displaying an application of the exciting tone filter.

For example, user input could signal a selection of an icon representing an "exciting" tone level. FIG. 4D illustrates an example of the graphical user interface displaying an application of the exciting tone filter. In response to user input signaling a selection of the icon representing "exciting" in the notification panel, the text processor 140 has returned a set of suggestions that apply an exciting tone to the message text in content pane 416, and extensions 110A, 110B have caused updating the content pane to highlight the extensions. User input to select the ACCEPT link 430 can cause extensions 110A, 110B to apply the tone suggestions to text in content pane 416.

Figure 5A:
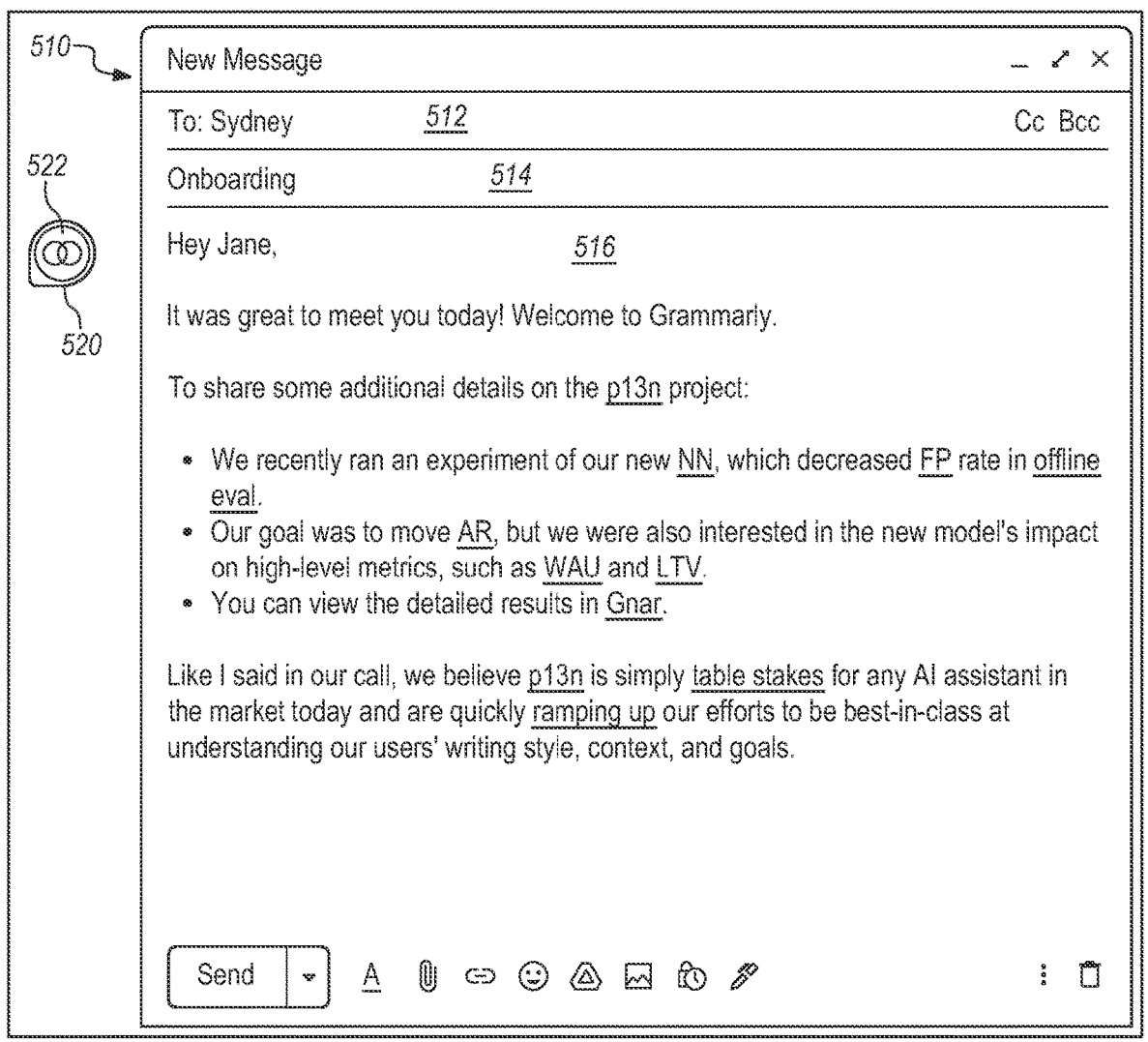
FIG. 5A illustrates an example of a graphical user interface that may be programmed to display a transparency filter in conjunction with an application.

FIG. 5A illustrates an example of a graphical user interface that may be programmed to display a transparency filter in conjunction with an application. In FIG. 5A, a graphical user interface (GUI) window 500 is displayed as part of executing an application program, browser, or other program executed at a second computer, such as a mobile computing device. In an embodiment, an application running with GUI window 500 provides email composing functions and has instantiated a sub-window 510 which shows a message that was composed by the user. The sub-window 510 includes a Recipients field 512 specifying "Sydney" as a message recipient, a subject field 514 specifying "Onboarding", and text of a message in a content pane 516. A filter panel 520 comprises a button 522 that is programmed to accept input to select a transparency filter. In an embodiment, a machine learning model of the text processor 140 to implement a transparency filter can generate suggestions to replace jargon, acronyms, obscure terms, poor metaphors or similes, or other text elements to make the new message more readable and understandable for others. One context in which transparency filtering can be beneficial is in communicating organizational information to new employees, contractors, or other team members who may be unfamiliar with institutional terms, jargon, or acronyms.

Figure 5B:
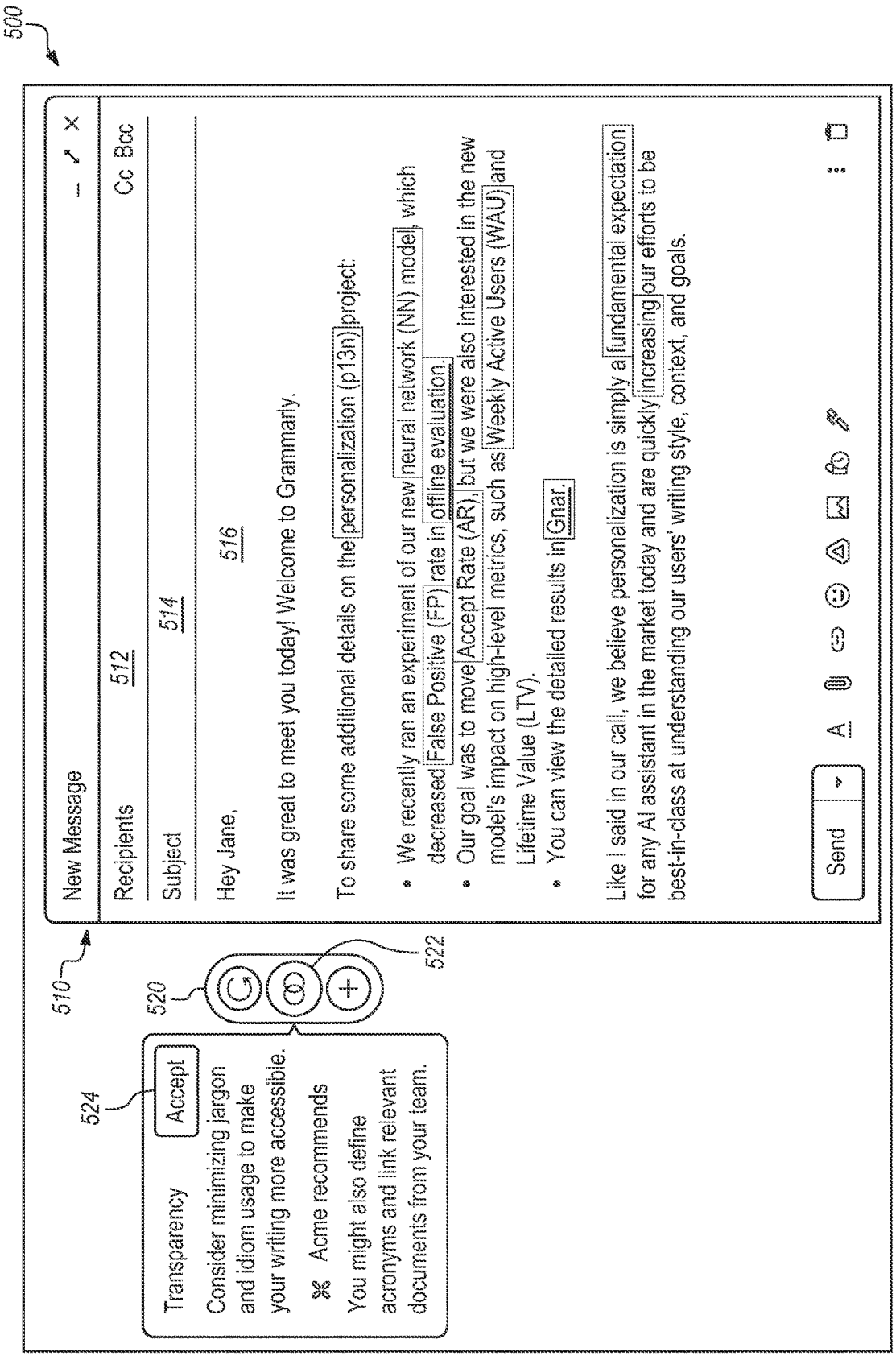
FIG. 5B illustrates an example of the graphical user interface displaying an application of the transparency filter.

In an embodiment, user input such as a single click on the button 522 causes selecting the transparency filter, and in response, extensions 110A, 110B are programmed to request text processor 140 to return a set of suggestions that improve the transparency of the text in content pane 516. FIG. 5B illustrates an example of the graphical user interface displaying an application of the transparency filter. In response to user input to select button 522, extensions 110A, 110B request and receive a set of suggestions that apply a transparency filter and update the text in content pane 416 to highlight the suggestions. In an embodiment, also in response, extensions 110A, 110B are programmed to generate and cause displaying a notification panel near button 522. In the example of FIG. 5B, the notification panel specifies "Transparency: Consider minimizing jargon and idiom usage to make your writing more accessible." In some embodiments, multiple notification messages can be given based on multiple different aspects of transparency that the text processor 140 detected in the message content; as an example, the notification panel can display a prompt such as "You might also define acronyms and link relevant documents from your team." User input to select an ACCEPT link 524 can cause extensions 110A, 110B to apply the suggestions to the text in content pane 516.

Figure 6A:
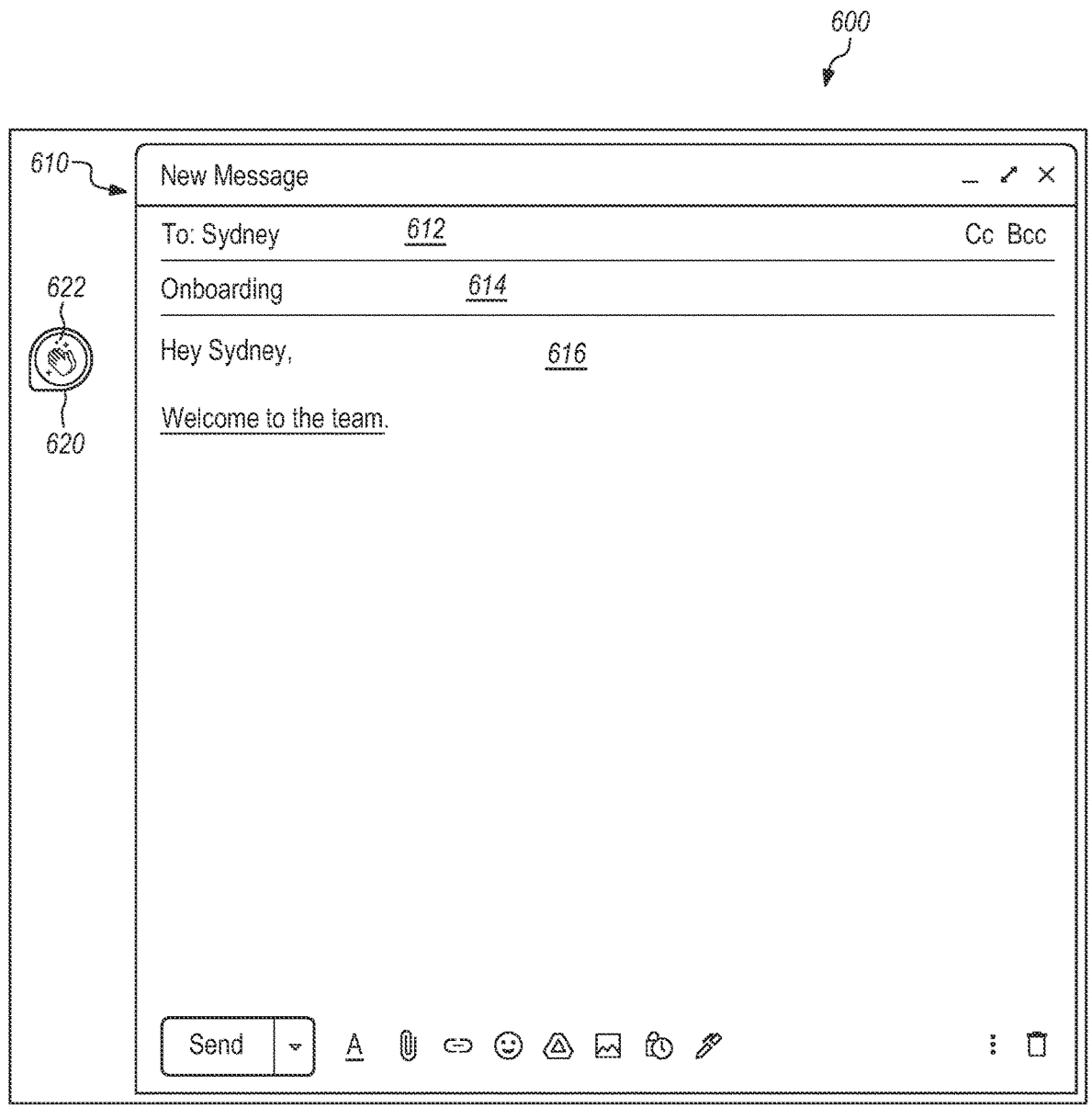
FIG. 6A illustrates an example of a graphical user interface that may be programmed to display an applause filter in conjunction with an application.

FIG. 6A illustrates an example of a graphical user interface that may be programmed to display an applause filter in conjunction with an application. In FIG. 6A, a graphical user interface (GUI) window 600 is displayed as part of executing an application program, browser, or other program executed at a second computer, such as a mobile computing device. In an embodiment, an application running with GUI window 600 provides email composing functions and has instantiated a sub-window 610 which shows, in FIG. 6, a message that was composed by the user. The sub-window 610 includes a Recipients list 612 specifying Sydney, a subject 614 of "Onboarding" in this example, and a content pane 616 having text of an email. In this example, the user has composed a message welcoming Sydney to the team. A filter panel 620 is displayed near content pane 616 and comprises a button 622 that is programmed to accept input to select an applause filter 622.

Figure 6B:
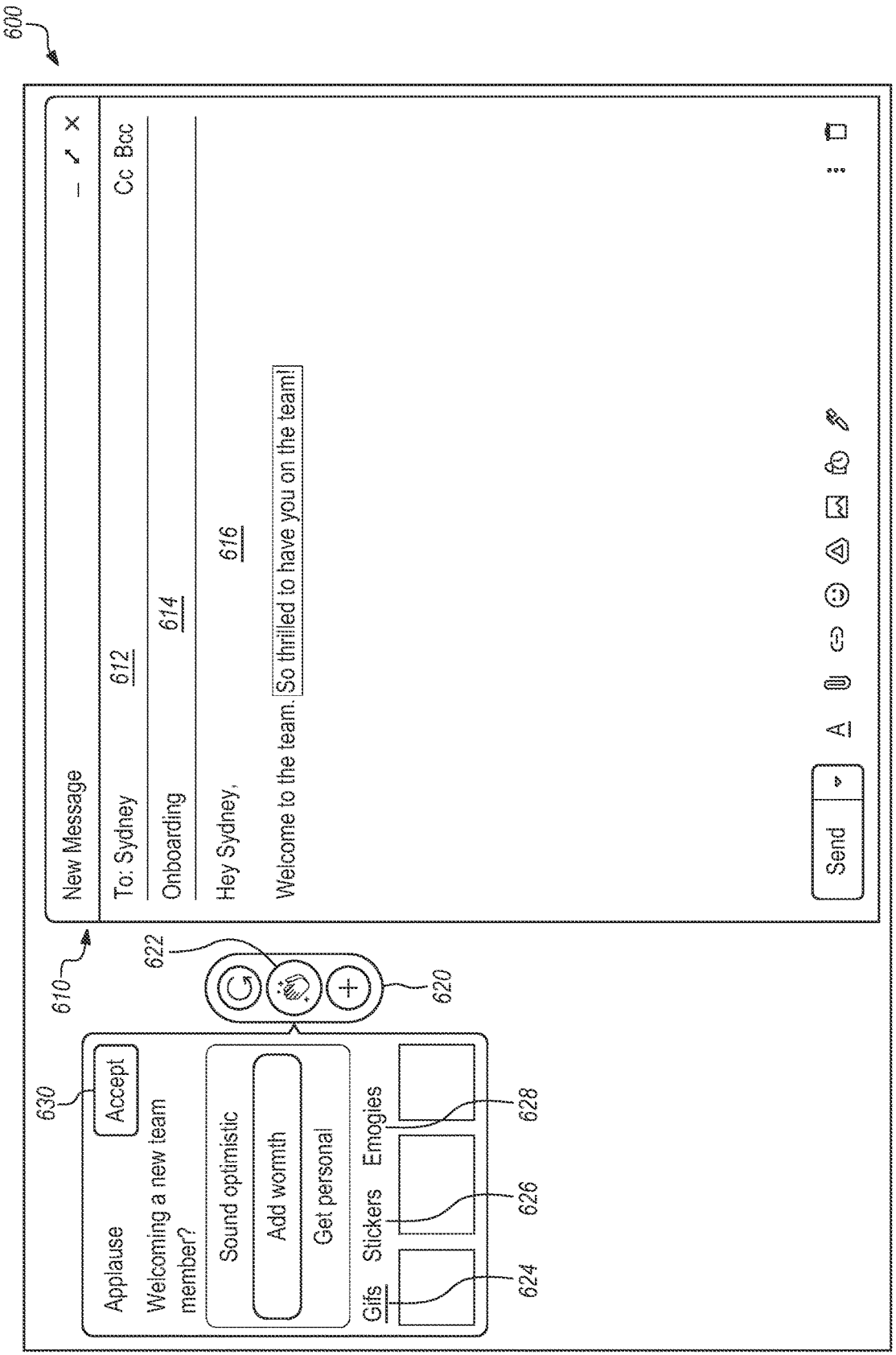
FIG. 6B illustrates an example of the graphical user interface displaying an application of the warm applause filter.

FIG. 6B illustrates an example of the graphical user interface displaying an application of the warm applause filter. In response to user input specifying a selection of button 622, in an embodiment, extensions 110A, 110B are programmed to cause updating the screen display to show a notification panel specifying one or more graphical widgets that are programmed to enable selection of different suggestions or modifications to text in content pane 616 that are associated with amplifying a tone of the text. In the example of FIG. 6B, the notification panel comprises widgets to select "sound optimistic", "add warmth", "get personal". Labels of the widgets can be associated with different levels of amplification or excitement. In an embodiment, the notification panel can display icons or widgets that are programmed to select graphical images to add to the message, including such as animated images in GIF format as indicated by GIF widget 624, stickers widget 626, and emojis widget 628. In the example of FIG. 6B, user input has signaled a selection of the "add warmth" widget; in response, extensions 110A, 110B are programmed to request the text processor 140 to apply a warm applause filter to the text, to receive a set of suggestions from the text processor, and to update content pane 616 to highlight the suggestions. In an embodiment, an ACCEPT link 630 is programmed to receive input to signal to accept the suggestions and to update content pane 616 to show the suggestions without highlighting.

Figure 6C:
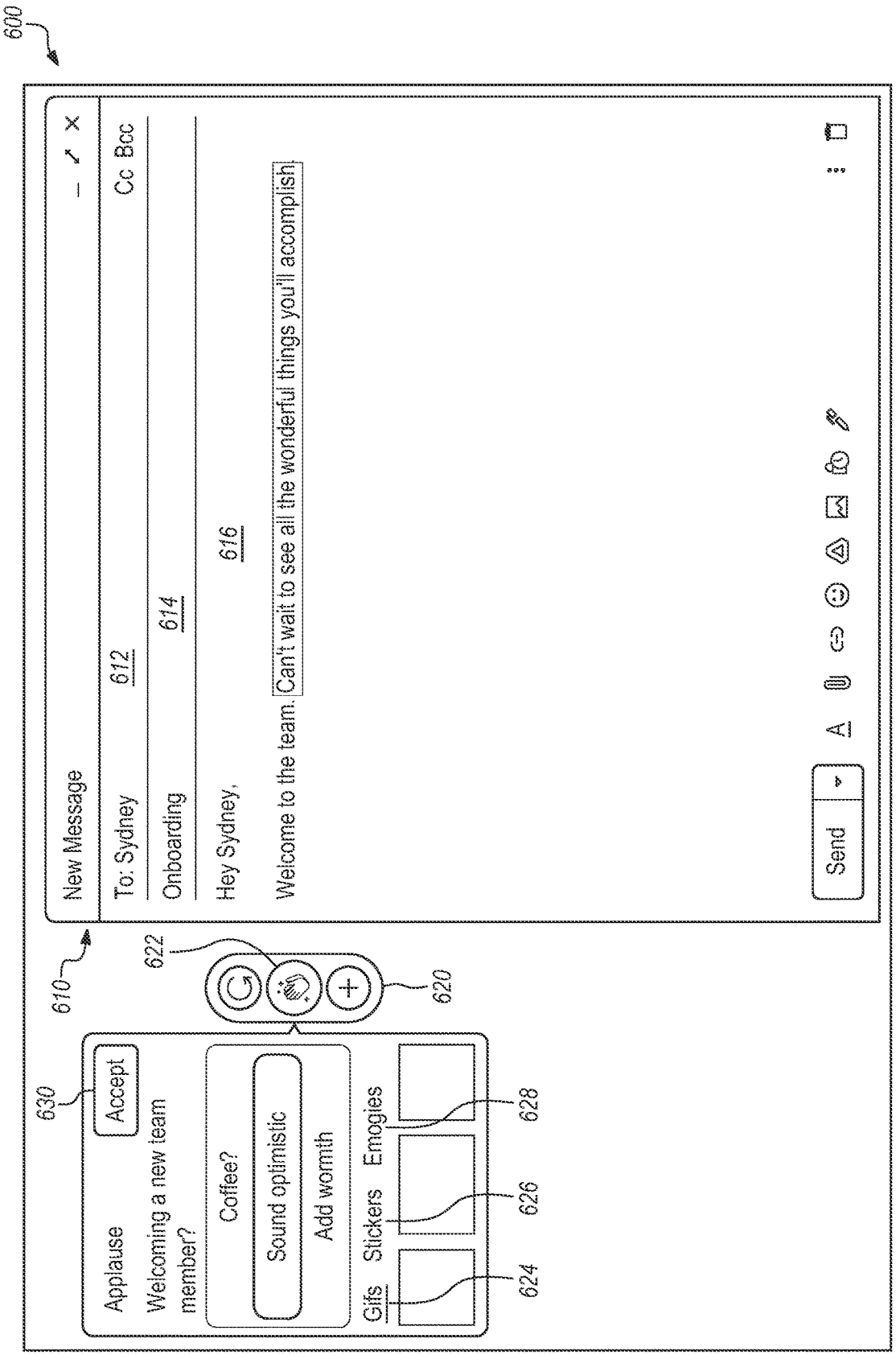
FIG. 6C illustrates an example of the graphical user interface displaying an application of the optimistic applause filter.

FIG. 6C illustrates an example of the graphical user interface displaying an application of the optimistic applause filter. In a manner similar to the input, programming, and operations of FIG. 6B discussed above, in FIG. 6C, user input has signaled a selection of a "sound optimistic" widget in the notification panel near button 622. In response, extensions 110A, 110B are programmed to request text processor 140 to generate a set of suggestions that apply the optimistic applause filter to the composed message, to receive the suggestions, and to update the content pane 616 to show the text with the suggestions and with highlighting of the suggestions. In an embodiment, the notification panel can include an ACCEPT link 630. In response to user input signaling a selection of the ACCEPT link 630, extensions 110A, 110B are programmed to update the content pane 616 to show the text with the suggestions and without highlighting.

Figure 7A:
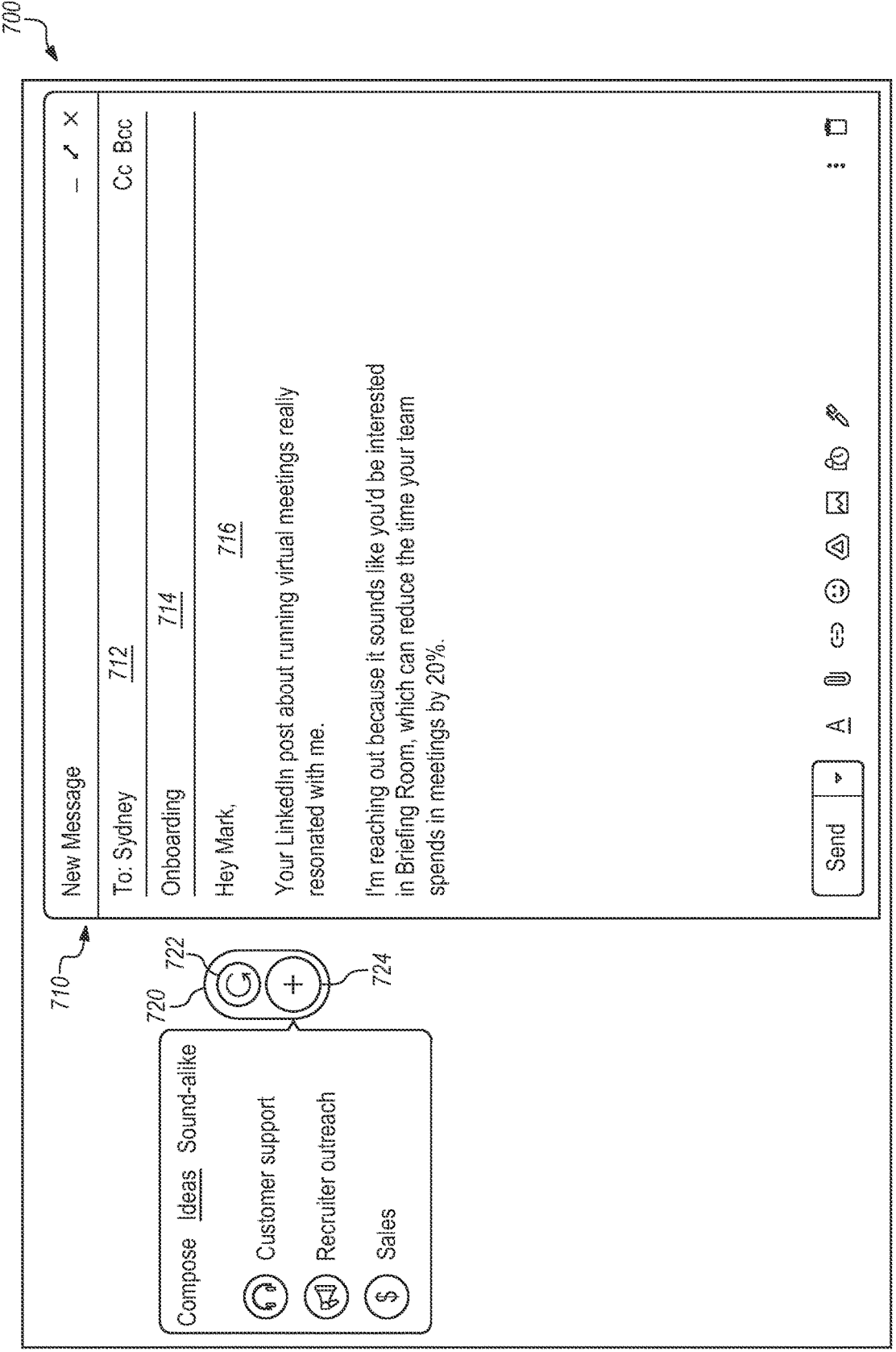
FIG. 7A illustrates an example of a graphical user interface that may be programmed to display an access to additional filters.

FIG. 7A illustrates an example of a graphical user interface that may be programmed to display an access to additional filters. In FIG. 7A, a graphical user interface (GUI) window 700 is displayed as part of executing an application program, browser, or other program executed at a second computer, such as a mobile computing device. In an embodiment, an application running with GUI window 700 provides email composing functions and has instantiated a sub-window 710 which shows, in FIG. 7, a message that was composed by the user. The sub-window 710 includes a Recipients list 712 specifying Sydney, a subject 714 of "Onboarding" in this example, and a content pane 716 showing text of a message. A filter panel 720 is displayed near the content pane 716 and comprises a button 722 that is programmed to receive user input to signal reversing an application of a filter to text in the content pane, and a button 724 that is programmed to receive user input to signal accessing additional text filters. In one embodiment, in response to input specifying a selection of button 724, extensions 110A, 110B are programmed to generate and cause updating the GUI window 700 to display a notification panel having active links or widgets to select other filters for text. In the example of FIG. 7A, labels "Compose", "Ideas", "Sound-alike", are associated with active links to select such filters. Further, in the example of FIG. 7A, user input has selected the link labeled "Ideas," and in response, extensions 110A, 110B have caused updating the notification panel to display links to select text filters related to customer support, filters related to recruiter outreach, and filters related to sales.

Figure 7B:
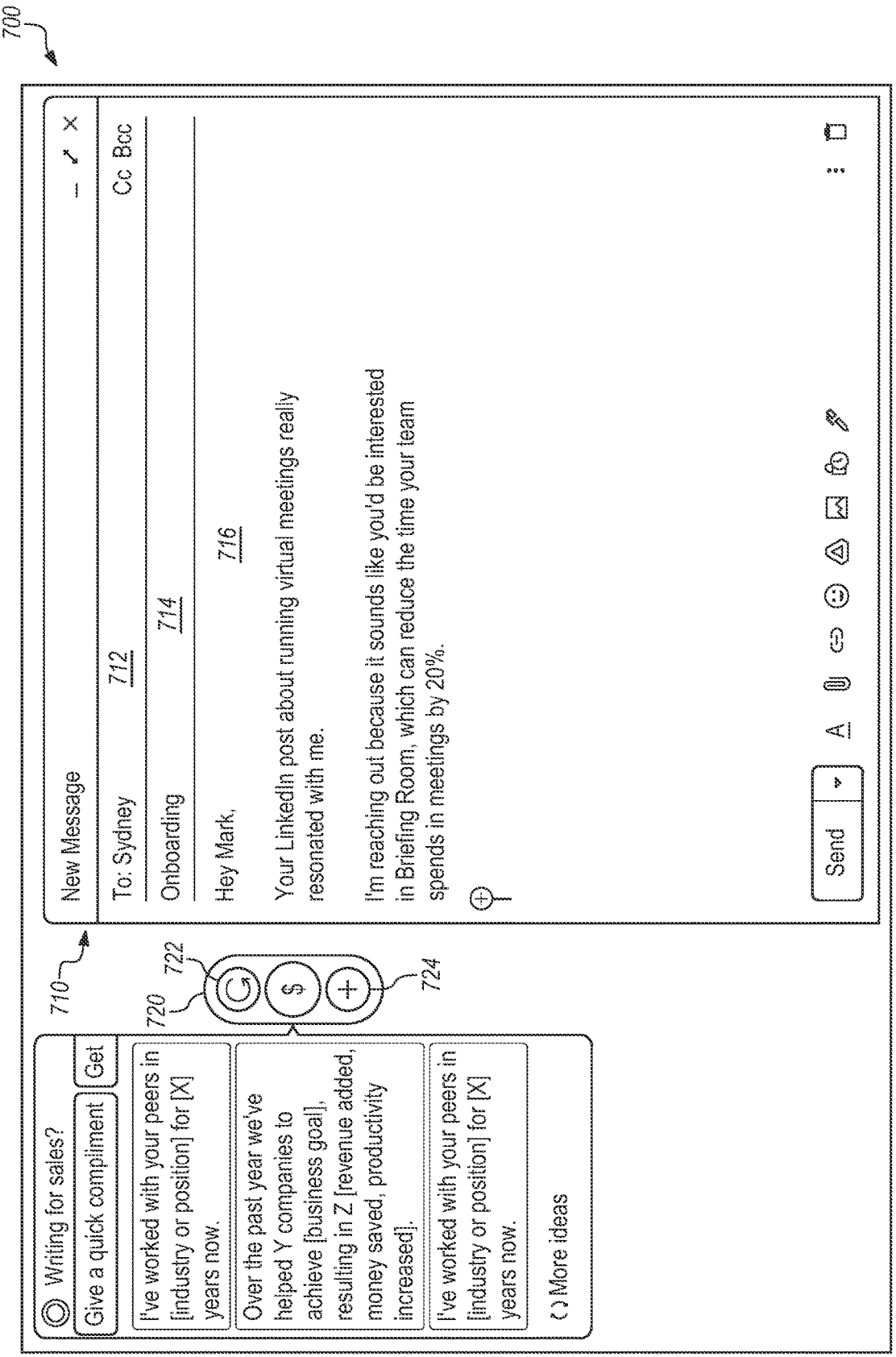
FIG. 7B illustrates an example of the graphical user interface displaying the sales filter.

Assume that user input signals a selection of the Sales link of the notification panel of FIG. 7A. In response, extensions 110A, 110B are programmed to update GUI window 700 to modify the notification panel and display information, suggestions, or links relating to sales communication. FIG. 7B illustrates an example of the graphical user interface displaying a sales filter. In FIG. 7B, the filter panel 720 comprises a button labeled "$" indicating that the sales filter had been selected. In an embodiment, extensions 110A, 110B are programmed to request the text processor to generate suggestions relating to sales communications and display one or more suggestions or text options in the notification panel. For example, the filter panel 720 displays options for giving a quick compliment that the user can adopt to the message.

Figure 8C:
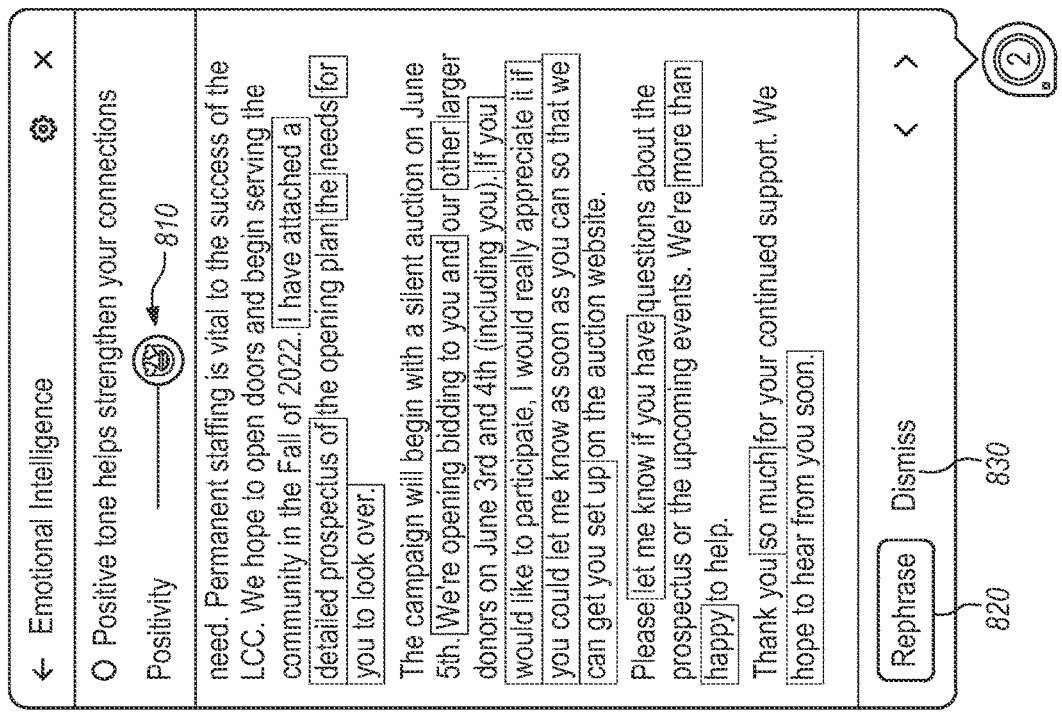

Each of FIG. 8A, FIG. 8B, and FIG. 8C illustrates an example of a graphical user interface that may be programmed to adjust the positivity of the tone filter. FIG. 8A shows the initial text. There is a slider 810 a user could drag left and right to modify the positivity of the text. The slider 810 for positivity is at the left end in this example, which indicates the tone may be least positive. The text processor 140 may highlight portions of the initial text that may be modified by the tone positivity. FIG. 8B shows the more positive text. The user has dragged the slider 810 slightly to the right, which corresponds to a more positive tone. The text processor 140 then modified some of the highlighted portions based on this positivity filter. The modified portion is highlighted as well, but in a more visible manner. After reviewing the highlighted modifications, the user may either select "rephrase" 820 to accept the modifications or "dismiss" 830 to decline the modifications. FIG. 8C shows the very positive text. The user has dragged the slider 810 all the way to the right, which corresponds to a very positive tone. The text processor 140 then modified more of the highlighted portions based on this positivity filter. The modified portions are highlighted as well in the more visible manner. After reviewing the highlighted modifications, the user may either select "rephrase" 820 to accept the modifications or "dismiss" 830 to decline the modifications.

The disclosure has described embodiments that can be programmed for providing a user with one-click access to various filters via a visual or graphical user interface to change the effectiveness of the communication with others via text while preserving the meaning of the text. Unlike prior approaches, embodiments are programmed to artificially understand the intent of the original text and respond to user selection of particular filters as a basis of suggesting other content to add. Furthermore, embodiments may interoperate with a visual or graphical user interface that is programmed to enable users to see the options of different filters, what the changes to the text will be, and whether they want these changes before they engage with the suggestions.

3. Implementation Example—Hardware Over View

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
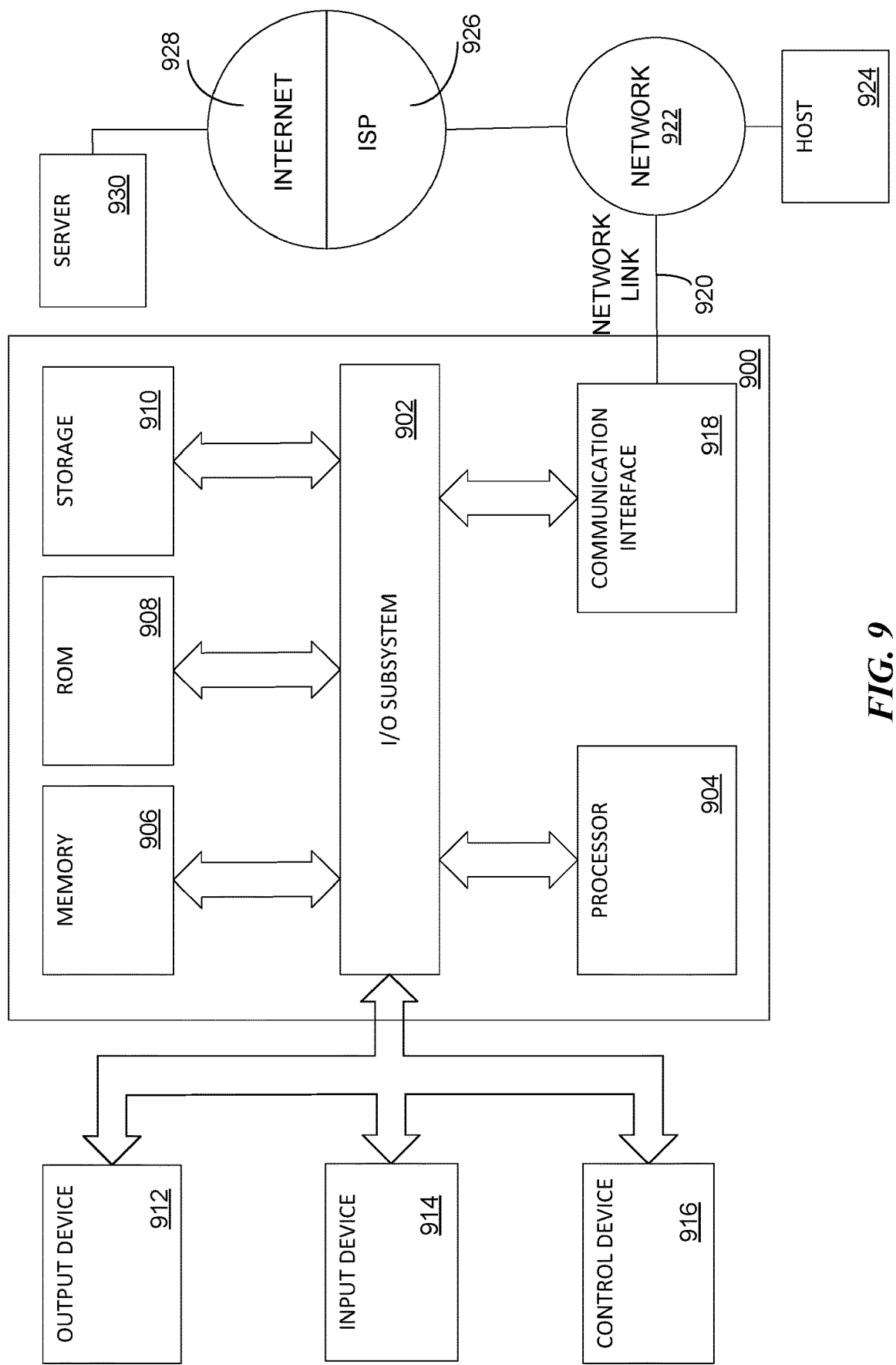
FIG. 9 illustrates a computer system with which one embodiment could be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanisms for communicating information and/or instructions between the components of the computer system 900 over electronic signal paths. The I/O subsystem 902 may include an I/O controller, a memory controller, and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or another dynamic storage device. Memory 906 also may be used for storing temporary variables or other intermediate information during the execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read-only memory (ROM) 908 or other static storage devices coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disks such as CD-ROM or DVD-ROM and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include another type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators, or servos.

At least one input device 914 is coupled to I/O subsystem 902 for communicating signals, data, command selections, or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or another type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware, and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 and place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to a network link(s) 920 that are directly or indirectly connected to at least one communication network, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 922 broadly represents a local area network (LAN), wide-area network (WAN), campus network, internetwork, or any combination thereof. Communication interface 918 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic, or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a worldwide packet data communication network represented as internet 928. A server computer 930 may be coupled to internet 928. Server 930 broadly represents any computer, data center, virtual machine, or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, server farm, or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer, and data storage layer such as a relational database system using a structured query language (SQL) or no SQL, an object store, a graph database, a flat-file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed at a first computer and comprising:

programmatically receiving a digital electronic object, the digital electronic object comprising a source text having been composed at a second computer;

dividing the source text into a plurality of source text units;

evaluating each particular source text unit among the plurality of source text units using a trained machine-learning model, the trained machine-learning model comprising a multi-class text classifier, and receiving a classification output from the trained machine-learning model that classifies each particular source text unit as a particular class among a plurality of possible classes, one or more classes of the plurality of possible classes corresponding to one or more filters;

sending, to the second computer, instructions for presenting the one or more filters via a user interface, the one or more filters being programmed to generate one or more first suggestions concerning the source text when the filters are selected and executed, each of the filters being programmed to generate a different type of the one or more first suggestions, each of the one or more first suggestions comprising a change to a character, word, phrase, or sentence of the source text;

receiving, from the second computer, a first input specifying a selection of a first filter of the one or more filters;

in response to detecting the first input specifying the selection of the first filter, generating an output set of two or more second suggestions for different portions of the source text based on executing the first filter over the source text and an explanation for the two or more second suggestions, generating the output set of two or more second suggestions comprising:

identifying one or more first source text units of a first class corresponding to the first filter from a plurality of source text units associated with the source text; and transforming the one or more first source text units to the output set of two or more second suggestions;

transmitting the output set of two or more second suggestions for the different portions of the source text and the explanation for the two or more second suggestions to the second computer; and receiving, from the second computer, a second input specifying to apply the two or more second suggestions, and in response to the second input, automatically applying the two or more second suggestions to the different portions of the source text and transmitting, to the second computer, updated presentation instructions which when rendered using the second computer cause displaying an updated text with the two or more second suggestions having been applied to the different portions of the source text.

2. The computer-implemented method of claim 1, each of the filters being programmed to execute a different type of adjustment of the source text which when executed causes the source text to be correct in spelling or grammar.

3. The computer-implemented method of claim 1, each of the filters being programmed to execute a different type of adjustment of the source text which when executed causes the source text to increase transparency.

4. The computer-implemented method of claim 1, each of the filters being programmed to execute a different type of applause adjustment of the source text which when executed causes the source text to sound optimistic or add warmth.

5. The computer-implemented method of claim 1, each of the filters being programmed to execute a different type of tone adjustment of the source text which when executed causes an adjustment of tone-positivity of the source text.

6. The computer-implemented method of claim 1, further comprising, before the transmitting, ranking the output set of two or more second suggestions based on a ranking criterion.

7. The computer-implemented method of claim 1, further comprising generating the output set of suggestions by:
   identifying the first class corresponding to the first filter from the one or more classes;
   identifying one or more first source text units of the first class from the plurality of source text units; and
   transforming the one or more first source text units to the output set of suggestions.

8. The computer-implemented method of claim 1, further comprising transforming the first source text units to the output set of two or more second suggestions by any one of:
   mapping the one or more first source text units to a plurality of candidate text-unit suggestions in a digital database, to yield an initial set of matching text-unit suggestions, and filtering the initial set of matching text-unit suggestions to yield the output set of two or more second suggestions; or
   mapping the one or more first source text units to a plurality of candidate text-unit suggestions in a digital database, to yield an initial set of matching text-unit suggestions, scoring the plurality of candidate text-unit suggestions, and selecting top N candidate text-unit suggestions to yield the output set of two or more second suggestions.

9. The computer-implemented method of claim 1, further comprising:
   the first computer executing a text processor that is communicatively coupled to a text processing extension that is executed at the second computer;
   programmatically receiving the digital electronic object comprising the source text via a message initiated at the text processing extension and transmitted to the text processor; and
   the text processing extension executing in association with an application program that is executing at the second computer, the text processing extension being programmed to automatically detect a change in a text entry window of the application program and, in response, to initiate the message.

10. The computer-implemented method of claim 1, further comprising:
   the first computer executing a text processor that is communicatively coupled to a text processing extension that is executed at the second computer;
   programmatically receiving the digital electronic object comprising the source text via a message initiated at the text processing extension and transmitted to the text processor; and
   the text processor executing in association with a browser that is executing at the second computer, the text processing extension being programmed to automatically detect a change in a text entry widget of the browser and, in response, to initiate the message.

11. One or more non-transitory computer-readable media storing one or more sequences of instructions which, when executed using a first computer, cause the first computer to execute:
   programmatically receiving a digital electronic object, the digital electronic object comprising a source text having been composed at a second computer;
   dividing the source text into a plurality of source text units;
   evaluating each particular source text unit among the plurality of source text units using a trained machine-learning model, the trained machine-learning model comprising a multi-class text classifier, and receiving a classification output from the trained machine-learning model that classifies each particular source text unit as a particular class among a plurality of possible classes, one or more classes of the plurality of possible classes corresponding to one or more filters;
   sending, to the second computer, instructions for presenting the one or more filters via a user interface, the one or more filters being programmed to generate one or more first suggestions concerning the source text when the filters are selected and executed, each of the filters being programmed to generate a different type of the one or more first suggestions, each of the one or more first suggestions comprising a change to a character, word, phrase, or sentence of the source text;
   receiving, from the second computer, a first input specifying a selection of a first filter of the one or more filters;
   in response to detecting the first input specifying the selection of the first filter, generating an output set of two or more second suggestions for different portions of the source text based on executing the first filter over the source text and an explanation for the two or more second suggestions, generating the output set of two or more second suggestions comprising:
   identifying one or more first source text units of a first class corresponding to the first filter from a plurality of source text units associated with the source text; and
   transforming the one or more first source text units to the output set of two or more second suggestions;
   transmitting the output set of two or more second suggestions for the different portions of the source text and the explanation for the two or more second suggestions to the second computer; and receiving, from the second computer, a second input specifying to apply the two or more second suggestions, and in response to the second input, automatically applying the two or more second suggestions to the different portions of the source text and transmitting, to the second computer, updated presentation instructions which when rendered using the second computer cause displaying an updated text with the two or more second suggestions having been applied to the different portions of the source text.

12. The one or more non-transitory computer-readable media of claim 11, each of the filters being programmed to execute a different type of adjustment of the source text which when executed causes the source text to be correct.

13. A computer system, comprising:
one or more central processing units;
one or more network interfaces that are configured to communicatively couple the one or more central processing units to a data communication network;
electronic digital random access memory storing a plurality of sequences of stored program instructions that are organized as executable checks for checking a digitally stored source text that is received via the data communication network from a computing device that is executing a text processing extension, a text-unit check among the executable checks comprising multi-class text classifier instructions coupled to text-unit suggestion instructions, the text-unit suggestion instructions being coupled to a digital text-unit store; and
the multi-class text classifier instructions and text-unit suggestion instructions being programmed to:
read the source text;
divide the source text into the plurality of source text units;
evaluate each particular source text unit among the plurality of source text units using a trained machine-learning model, the trained machine-learning model comprising a multi-class text classifier, and receiving a classification output from the trained machine-learning model that classifies each particular source text unit as a particular class among a plurality of possible classes, one or more classes of the plurality of possible classes corresponding to one or more filters;
send, to the computing device via the data communication network, instructions for presenting the one or more filters via a user interface, the one or more filters being programmed to generate one or more first suggestions concerning the source text when the filters are selected and executed, each of the filters being programmed to generate a different type of the one or more first suggestions, each of the one or more first suggestions comprising a change to a character, word, phrase, or sentence of the source text;
receive, from the computing device via the data communication network, a first input specifying a selection of a first filter of the one or more filters;
in response to detecting the first input specifying the selection of the first filter, generate an output set of two or more second suggestions for different portions of the source text based on executing the first filter over the source text and an explanation for the two or more second suggestions, generating the output set of two or more second suggestions comprising:
identifying one or more first source text units of a first class corresponding to the first filter from a plurality of source text units associated with the source text; and
transforming the one or more first source text units to the output set of two or more second suggestions;
transmit the output set of two or more second suggestions for the different portions of the source text and the explanation for the two or more second suggestions to a second computer; and
receive, from the second computer, a second input specifying to apply the two or more second suggestions, and in response to the second input, automatically applying the two or more second suggestions to the different portions of the source text and transmitting, to the second computer, updated presentation instructions which when rendered using the second computer cause displaying an updated text with the two or more second suggestions having been applied to the different portions of the source text.

14. The computer system of claim 13, each of the filters being programmed to execute a different type of adjustment of the source text which when executed causes the source text to be correct in spelling or grammar.

15. The computer system of claim 13, each of the filters being programmed to execute a different type of adjustment of the source text which when executed causes the source text to increase transparency.

16. The computer system of claim 13, each of the filters being programmed to execute a different type of applause adjustment of the source text which when executed causes the source text to sound optimistic or add warmth.

17. The computer system of claim 13, each of the filters being programmed to execute a different type of tone adjustment of the source text which when executed causes an adjustment of tone-positivity of the source text.

18. The computer system of claim 13, the memory further comprising sequences of instructions which, when executed using the one or more central processing units, cause the one or more central processing units to execute, before the transmitting, ranking the output set of two or more second suggestions based on a ranking criterion.

19. The computer system of claim 13, the memory further comprising sequences of instructions which, when executed using the one or more central processing units, cause the one or more central processing units to execute generating the output set of suggestions by:
identifying the first class corresponding to the first filter from the one or more classes;
identifying one or more first source text units of the first class from the plurality of source text units; and
transforming the one or more first source text units to the output set of suggestions.

20. The computer system of claim 13, the memory further comprising sequences of instructions which, when executed using the one or more central processing units, cause the one or more central processing units to execute transforming the first source text units to the output set of two or more second suggestions by any one of:
mapping the one or more first source text units to a plurality of candidate text-unit suggestions in a digital database, to yield an initial set of matching text-unit suggestions, and filtering the initial set of matching text-unit suggestions to yield the output set of two or more second suggestions; or
mapping the one or more first source text units to a plurality of candidate text-unit suggestions in a digital database, to yield an initial set of matching text-unit suggestions, scoring the plurality of candidate text-unit suggestions, and selecting top N candidate text-unit suggestions to yield the output set of two or more second suggestions.

21. The computer system of claim 13, further comprising:
the a text processor that is communicatively coupled to a text processing extension that is executed at the second computer;
the memory further comprising sequences of instructions which, when executed using the one or more central processing units, cause the one or more central processing units to execute programmatically receiving the digital electronic object comprising the source text via a message initiated at the text processing extension and transmitted to the text processor; and
the text processing extension executing in association with an application program that is executing at the second computer, the text processing extension being programmed to automatically detect a change in a text entry window of the application program and, in response, to initiate the message.

22. The computer system of claim 13, further comprising:
a text processor that is communicatively coupled to a text processing extension that is executed at the second computer;
the memory further comprising sequences of instructions which, when executed using the one or more central processing units, cause the one or more central processing units to execute programmatically receiving the digital electronic object comprising the source text via a message initiated at the text processing extension and transmitted to the text processor; and
the text processor executing in association with a browser that is executing at the second computer, the text processing extension being programmed to automatically detect a change in a text entry widget of the browser and, in response, to initiate the message.

* * * * *

UNITED STATES PATENT AND TRADEMARK OFFICE
CERTIFICATE OF CORRECTION

PATENT NO. : 12,333,247 B1
APPLICATION NO. : 17/896476
DATED : June 17, 2025
INVENTOR(S) : Valentyn Gaidylo et al.

Page 1 of 1

It is certified that error appears in the above-identified patent and that said Letters Patent is hereby corrected as shown below:

In the Claims

In Column 29, Line 35, delete "into the" and insert -- into a -- therefor.

In Column 31, Line 7, delete "the a text" and insert -- a text -- therefor.

Signed and Sealed this
Twenty-ninth Day of July, 2025

Coke Morgan Stewart
*Acting Director of the United States Patent and Trademark Office*